United States Patent
Fendel

[19]
[11] Patent Number: 5,924,444
[45] Date of Patent: Jul. 20, 1999

[54] RAPID RESPONSE VALVE

[75] Inventor: Edwin B. Fendel, Kinnelon, N.J.

[73] Assignee: Innovent Inc., Princeton, N.J.

[21] Appl. No.: 08/894,887

[22] PCT Filed: Dec. 27, 1996

[86] PCT No.: PCT/US96/20831
§ 371 Date: Dec. 18, 1997
§ 102(e) Date: Dec. 18, 1997

[87] PCT Pub. No.: WO97/25442
PCT Pub. Date: Jul. 10, 1997

[51] Int. Cl.[6] .............. F16K 15/14; F16K 15/02
[52] U.S. Cl. .......................... 137/538; 137/226
[58] Field of Search ................... 137/226, 228, 137/230, 538, 614.05

[56] References Cited

U.S. PATENT DOCUMENTS

| | | | |
|---|---|---|---|
| 1,250,503 | 12/1917 | Ray | 137/230 |
| 1,539,865 | 6/1925 | Pratt | 137/230 |
| 2,505,949 | 5/1950 | DeVilbiss | 137/53 |
| 3,426,787 | 2/1969 | Fuller | 137/226 |
| 3,450,147 | 6/1969 | Webb | 137/226 |
| 3,491,786 | 1/1970 | Crossman et al. | 137/102 |
| 4,072,048 | 2/1978 | Arvan | 73/146.8 |
| 4,076,037 | 2/1978 | Perez | 137/230 |
| 4,246,930 | 1/1981 | Bishop et al. | 137/493.9 |
| 4,313,463 | 2/1982 | Weirich | 137/538 |
| 4,790,347 | 12/1988 | Weirich et al. | 137/484.2 |
| 5,094,266 | 3/1992 | Ledbetter | 137/469 |
| 5,181,977 | 1/1993 | Gneiding et al. | 152/429 |
| 5,203,372 | 4/1993 | Freiler | 137/469 |
| 5,285,813 | 2/1994 | Quante et al. | 137/494 |
| 5,316,033 | 5/1994 | Schumacher et al. | 137/614 |

FOREIGN PATENT DOCUMENTS 0 096 303   12/1983   European Pat. Off. .

*Primary Examiner*—John Rivell
*Attorney, Agent, or Firm*—Synnestvedt & Lechner LLP

[57] ABSTRACT

A valve releases fluid from a high pressure source to a low pressure receiver and includes a housing (301) having a first cavity (312), a second cavity (313), an annular interior sealing surface (318), an elastomeric ring (303), a poppet (302) and an actuator (304) for controlling the poppet's axial movement disposed coaxially within the housing (301). The poppet has a substantially cylindrical side wall, forming an external sealing surface (317). The poppet has fluid channels (310) for channeling fluid from the first cavity (312) radially outward through at least one orifice (311) in the side wall. When closed, the elastomeric ring (303) contacts the exterior sealing surface (317) and the interior sealing surface (318) sealing the first cavity (312) from the second cavity (313). When open, the orifice (311) is disposed relative to the elastomeric ring (303) such that fluid exiting the orifice deforms the elastomeric ring (303) outwardly forming a gap (314).

20 Claims, 19 Drawing Sheets

RAPID RESPONSE VALVE

BACKGROUND OF THE INVENTION

1. Field of Invention

The present invention generally relates to a device for releasing fluid from a relatively high pressure source to a relatively low pressure receiver. More particularly, the invention relates to a valve for rapidly deflating pressurized containers, such as pneumatic vehicle tires, to desired, predetermined pressures.

2. Background

Many conventional devices for relieving fluid pressure from a container are known to exhibit undesirable characteristics. Such undesirable characteristics include slowness of pressure relief, instabilities or oscillations in the motion of valve components during pressure relief resulting in high frequency noise (i.e., a "screech"), excessively high wear rate on sealing components, and short valve life. Additionally, conventional devices typically suffer from hysteresis during the opening and closing functions of the valve. This hysteresis leads to an inaccurate and unrepeatable threshold relief pressure. Therefore, a need exists for an accurate valve that can relief pressure quickly without oscillation and component wear. The present invention fulfills this need among others.

SUMMARY OF THE INVENTION

The present invention relates to a valve for releasing fluid from a relatively higher pressure source to a relatively lower pressure receiver. The valve comprises a housing having a first cavity, a second cavity, and an annular internal sealing surface. The first and second cavities are axially disposed, and the annular interior sealing surface is axially disposed between them. The first cavity also has a connection mechanism for operatively connecting to the source. The valve also comprises an elastomeric ring and a poppet disposed coaxially within the housing. The poppet has a substantially cylindrical side wall, at least a portion of which is an external sealing surface. Additionally, the poppet has fluid channels for channeling the fluid from the first cavity radially outward through at least one orifice in the side wall. The poppet is axially movable at least between a closed position and an opened position. In the closed position, the elastomeric ring contacts the exterior sealing surface and the interior sealing surface such that the first cavity is hermetically sealed from the second cavity. In the open position, the orifice is disposed relative to the elastomeric ring such that fluid radially exiting the orifice deforms the elastomeric ring outwardly forming a gap between the side wall and the elastomeric ring. The gap enhances the egress of fluid from the first cavity to the second cavity. The valve also comprises an actuator for controlling the poppet's axial movement between the closed and open positions.

One preferred embodiment of the invention relates to a valve with selectable relief pressures. In yet another embodiment, the valve provides visual indication of the pressure in the fluid container. A further embodiment provides for the input of fluid through the relief valve. These and other features and benefits of the present invention will be apparent to those skilled in the art upon consideration of the following detailed description.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

DETAILED DESCRIPTION OF THE PRESENT INVENTION

Figure 1A:
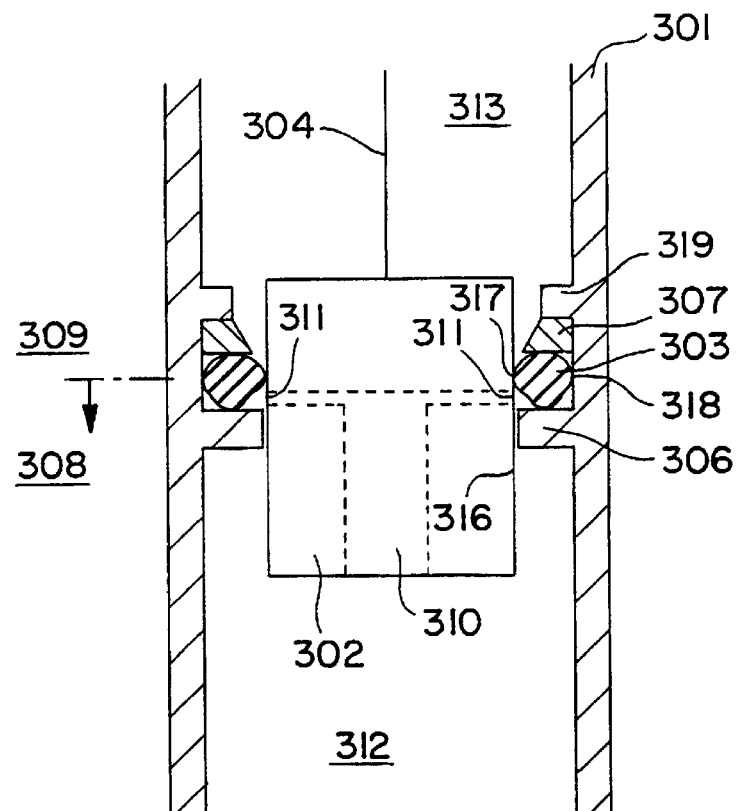
FIGS. 1a & 1b are schematic axial sectional views of the valving mechanism according to principles of this invention in a closed and open position respectively.

The present invention relates to a device for releasing fluid from a relatively higher pressure source to a relatively lower pressure receiver. As used herein, the term "fluid" broadly refers to liquids or gases, or combinations thereof. The terms "source" and "receiver" broadly refer to any fluid environment such as the open atmosphere, or any container including rigid structures such as metallic and composite air tanks, or flexible enclosures such as rubber tires and balloons. For example, the source may be a pressurized tank and the receiver may be the atmosphere. Conversely, the source may be the atmosphere and the receiver may a tank under vacuum. The only restriction on the source and receiver is that the source be at a higher initial pressure than the receiver.

In its basic embodiment, the invention involves a valve comprising (1) a housing, (2) an elastomeric ring, (3) a poppet, and (4) actuation means. These elements are described below in light of FIGS. 1A & 1B, which depict a schematic cross-sectional view of the valve in a closed and opened position respectively.

1. Housing

The housing 301 is separated into a first cavity 312 and a second cavity 313 which are axially disposed. Disposed between the first and second cavities 312, 313 is an annular interior sealing surface 316 adapted to form a seal with the elastomeric ring 303. The term annular as used herein broadly refers to circular, nearly circular, ovular, elliptical, or similar shapes. The housing may be integral or a combination of discrete components.

The housing also has connection means for operatively connecting the first cavity to the source. The connection means employed depends upon the source and may range from simple threads on the inside of the housing to a valve assembly having sequencing and control features.

To prevent the elastomeric ring's axial movement within the housing, it is preferable to employ restraining means. The restraining means depicted in FIGS. 1A and 1B involves an annular groove to receive and secure the elastomeric ring 303. In this embodiment, the annular groove comprises the interior sealing surface 316, a housing shoulder 306, and a backup ring 307 held in place by a second shoulder 319. It should also be understood that other annular grove configurations are possible as well as other restraining means in general. For example, other suitable restraining means include a groove recessed into the housing, various combinations of shoulders/ridges and a backup ring, and high friction texturing or adhesive. Moreover, the retaining means can be discrete or integral to the housing, and different approaches may be used in combination or individually.

2. Elastomeric Ring

The elastomeric ring comprises an essential element for hermetically sealing the first cavity 312 from the second cavity 313. The term "ring" as used in this disclosure broadly refers to O-rings, gaskets, and other deformable seals having an annular shape. For descriptive purposes, the seal 303 is divided roughly hemispherically into a first and second portion 308, 309, as shown by the dotted line. The first and second portions 308, 309 correspond in orientation to the first and second cavities 312, 313.

3. Poppet

The poppet 302 is disposed coaxially in the housing 301 and extends between the first and second cavities 312, 313. It has a substantially cylindrical side wall 316, a portion of which is an exterior sealing surface 317. The term cylindrical as used herein broadly describes a three dimensional figure having a circular, nearly circular, ovular, elliptical or similar cross-sectional shape.

The poppet 302 also comprises fluid channeling means 310. The fluid channeling means as used herein broadly refers to slots, orifices, baffles, conduit, passageways, permeable membranes, or any other means for guiding fluid flow. The fluid channeling means enables fluid communication between the first and second cavities when the poppet is an opened position (discussed below). More specifically, the channeling means 310 directs the fluid 315 such that it enters the poppet 302 from the first cavity 312 and exits substantially radially from at least one orifice 311 in the side wall 316.

Figure 1B:
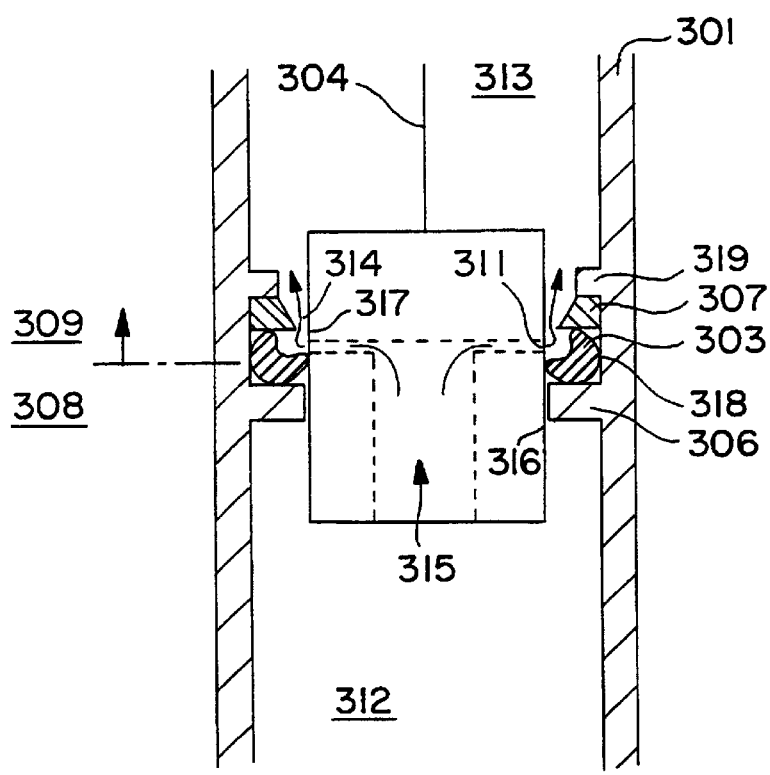

The poppet 302 is axially moveable within the housing to at least an open position (as shown in FIG. 1A), and a closed position (as shown in FIG. 1B). When said poppet is in the closed position (FIG. 1A), the orifice 311 is proximate to the first portion 308. Fluid from the first cavity 312 therefore is able to exert pressure on the first portion of the seal 303 via the channeling means 310 and radial orifice 311. This pressure urges the elastomeric ring 303 toward the backup ring 307 causing the elastomeric ring 303 to deform such that it contacts both the interior and exterior sealing surfaces 306, 317, thereby hermetically sealing the first cavity 312 from the second cavity 313. In accordance with conventional "O" ring seal designs, the sealing effect becomes more positive with increasing pressure in the first cavity 312 providing the poppet 302 remains in the closed position.

When the poppet 302 is in the open position (FIG. 1B), the orifice 311 is proximate to the second portion 309. Fluid 315 enters the fluid channeling means 310 of the poppet 302 from the first cavity 312 and radially exits from the side wall 316 through the orifice 311. Since the exterior sealing surface 317 of the poppet 302 has been displaced and no longer contacts the elastomeric ring 303, fluid is free to flow past the elastomeric ring 303 to the second cavity 313. This flow is directed substantially radially against the elastomeric ring 303, which promotes the formation of a gap 314 between the elastomeric ring 303 and the side wall 316. The formation of the gap 314 provides for improved egress of fluid from the source.

4. Actuation Means

The movement of the poppet 302 within the housing 301 is controlled by the actuation means 304. The configuration and functionality of the actuating means depends upon the application. In pressure regulation applications, for example, the movement of the poppet can be a function of force equalization between a fluid pressure force and an urging force.

The fluid pressure force results when the source is operatively connected to the first cavity and its higher pressure fluid exerts pressure on the poppet since the poppet is partially disposed in the first cavity. This pressure has the effect of urging the poppet toward the second cavity.

Countering this force is urging means, such as springs or elastomeric material. The urging means is operatively connected to the poppet such that it urges the poppet toward the first cavity.

If the fluid pressure in the first cavity is greater than the urging force, then the poppet will shift toward the second cavity into the open position as shown in FIG. 1b. When the poppet moves into the open position, the exterior sealing surface 317 no longer contacts the elastomeric ring 303 allowing fluid to flow from the first cavity 312 past the elastomeric ring 303 and into the second cavity 313. As the flow develops, the elastomeric ring 303 deforms radially outward thereby increasing the gap 314 available for fluid flow.

If left to force equalization, the poppet will return to the closed position after enough fluid has exited the first cavity to reduce the pressure on poppet below that exerted by the urging means. As the valve closes, radial fluid flow against the elastomeric ring 303 decreases allowing it to return to its non-deformed shape. In the closed position shown in FIG. 1a, the exterior sealing surface 317 and the interior sealing surface 318 again contact the elastomeric ring 303 to hermetically seal the first cavity 312 from the second cavity 313.

The ability of the fluid to deform the elastomeric ring 303 outwardly and increase a fluid egress from the first cavity 312 provides for a valve that requires very little axial movement for actuation. To open the valve, the poppet travels less than the height of elastomeric ring such that the orifice moves from the first portion of the elastomeric ring to the second portion. Such minor travel incurs little frictional losses, and, thus, the pressure at which valve opens/closes is repeatable within a small error.

On the other hand, since the fluid pressure must be high enough not only to move the poppet, but also to deform the seal, a certain amount of hysteresis is present in the system which increases its stability. This hysteresis prevents the valve from vacillating between the open and closed position each time there is a slight change in the pressure of the source. Thus, if the valve is connected to a tire, it would have a certain amount of resistance to opening each time the tire experience a road shock.

It should be understood that although the present invention is particularly well suited for pressure equalization actuation, other types are possible such as mechanical actuation, a combination of mechanical actuation and equalization actuation, and timed actuation.

Specific embodiments of the present invention will now be considered in FIGS. 2–19 in light of the principles of the invention discussed above. It should be understood that the particular valves disclosed are for demonstrative purposes and should not be construed to limit the scope of invention. Moreover, the particular aspects of each embodiment may be varied and interchanged with other embodiments to form a multitude of combinations.

Figure 2:
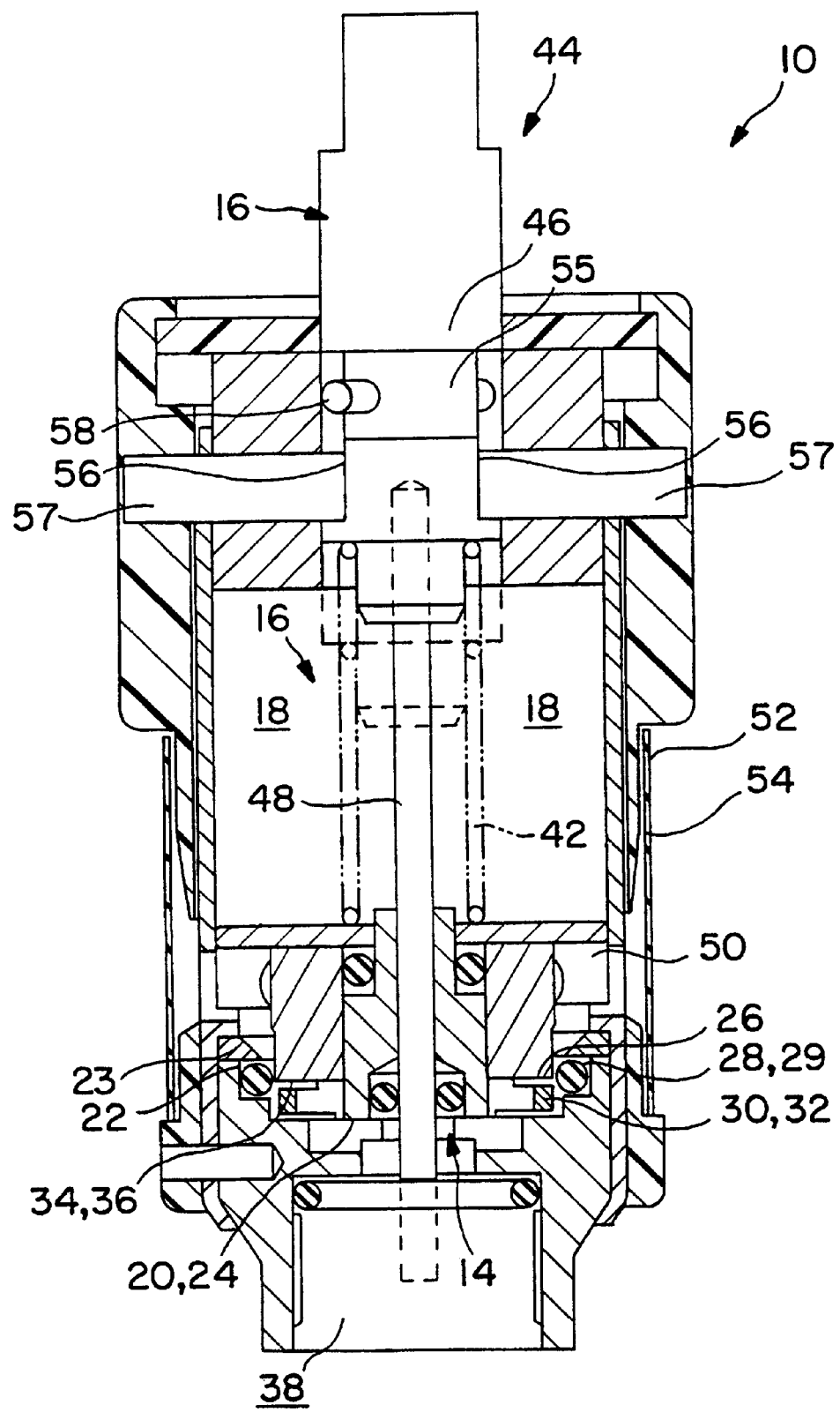
FIG. 2 is a schematic axial sectional view of an embodiment of the apparatus.

Referring now to FIG. 2 of the drawings, there is depicted a relief valve 10 that comprises a generally hollow cylindrical housing assembly 12, an axially movable valve poppet assembly 14 disposed coaxially within housing 12, sealing means 28 and actuating means including spring loading means 16 being at least partly disposed within the housing 12.

Housing assembly 12 comprises a first and second cavity 18, 38, an annular seat 20, an annular cylindrical internal seal surface 22 disposed near and above seat 20, and a annular retention shoulder 23 adjacent to surface 22. Relief valve 10 is intended to be connected to a container of pressurized fluid, for instance, a pneumatic tire. For such a purpose, the first cavity 38 of housing 12 has connection means to a container of fluid. Connection means are known in the art and may include an O-ring seal and a female thread adapted for receiving a conventional tire valve stem.

In this embodiment, housing assembly 12 further includes at least one vent orifice 50 and an elastomeric (or rubber) tubular that covers the vent orifices. When fluid is vented from orifice 50, the fluid pressure tends to lift up sleeve 52 from its seating and allows fluid to escape. To promote fluid escape, sleeve 52 can be provided with at least one slit 54 that is normally closed, but opens elastically in response to vent pressure. The sleeve prevents entry of dirt into the valve.

Sealing means 28 includes a seal 29, shown here in form of an elastomeric O-ring disposed between the interior sealing surface 22 and the exterior sealing surface 26. The seal 29 provides for dynamic sealing between movable poppet 14 and the housing 12 while the poppet is in its closed position.

Valve poppet assembly 14 comprises fluid channeling means 34 for venting fluid from first cavity 38. In this embodiment, fluid channeling means 34 includes an annular orifice 36 that is disposed between outer surface 32 and exterior sealing surface 26. When poppet 14 is in the open position, the seal between exterior sealing surface 26 and the seal 29 (and thereby between surface 26 and seal surface 22) is broken allowing fluid to pass through the orifice 36 and into the second cavity. Fluid flow through the orifice 36 is directed substantially radially outwardly against the O-ring seal 29 which elastically deforms substantially radially outwardly and in a direction away from sealing contact with the exterior sealing surface 26. This creates an annular gap 40 between surface 26 and seal 28. The egress of fluid from the pressurized container is thereby enhanced by the annular gap.

Valve poppet assembly 14 comprises a travel stop 24 that seats against seat 20 while poppet 14 is at the extreme lower end of its axial movement. Valve poppet 14 further comprises a cylindrical exterior sealing surface 26 disposed near stop 24 above seat 20. Surface 26 can be of a low-friction plastic material to provide advantageous operating characteristics for the relief valve. In this particular embodiment, the poppet is in its closed position when its stop 24 is against or near seat 20, and in the opened position when its stop 24 is distal from the seat 20.

Valve poppet assembly 14 further includes restraning means 30 to restrain seal 29 from deforming excessively under flow forces while poppet 14 is in an open position. In this embodiment, restraining means 30 includes a cylindrical outer surface 32 that contacts the O-ring 28 while the poppet has lifted from seat 20. Outer surface 32 can be of a low-friction plastic material to provide advantageous operating characteristics for the relief valve.

Actuating means includes spring loading means 16 having a compression spring 42, and an actuating device 44 having an activating pin 46 and a push rod 48. Spring 42 extends between activating pin 46 and poppet 14 and preloads the poppet axially downwardly toward seat 20. Actuating device 44 is borne within housing 12 to facilitate limited axial translation and rotation of activating pin 46. For instance, when the relief valve is connected to a standard tire valve stem of a pressurized tire, downward axial translation of pin 46 causes push rod 48 to extend into the tire valve stem and to depress and open the tire valve. When the tire valve is opened, the first cavity 38 is exposed to the fluid pressure in the tire. In this manner, actuating device 44 and, more specifically, activating pin 46 and push rod 48 are operative as means for exposing the poppet 14 to the pressurized fluid, and consequently forcing poppet 14 against the loading of spring 42. Moreover, the activating pin 46 can serve as a means for indicating the release of pressurized fluid into the first cavity since its axial movement relative to the housing is visually detectable. Limited rotation or twist of pin 46 provides for holding and locking of the pin in its extended axial position.

The means for locking the activating means in activation position holds and locks pin 46 (and therewith rod 48) in activation position. The means for locking comprises a circular groove 55 in pin 46, two flats opposed to one another on the periphery of pin 46 beneath groove 55, two dowels 57 fixed radially in housing 12, and a stop pin 58 fixed radially through pin 46 in groove 55 (and protruding above bottom of groove 55). Depression of pin 46 moves flats 56 past dowels 5 groove 55 is aligned with the dowels 57. Subsequent turning or twisting of pin 46 engages dowels 57 in groove 55 against axial motion. Pin 46 is twisted (for instance 90 degrees) until stop pin 58 contacts dowels 57. Thus, actuating means 16 (specifically 44) is locked in actuating position whereby push rod 48 (attached to pin 46) holds open the t valve and is thereby operative as means for exposing poppet 14 to pressurized fluid.

Figure 3A:
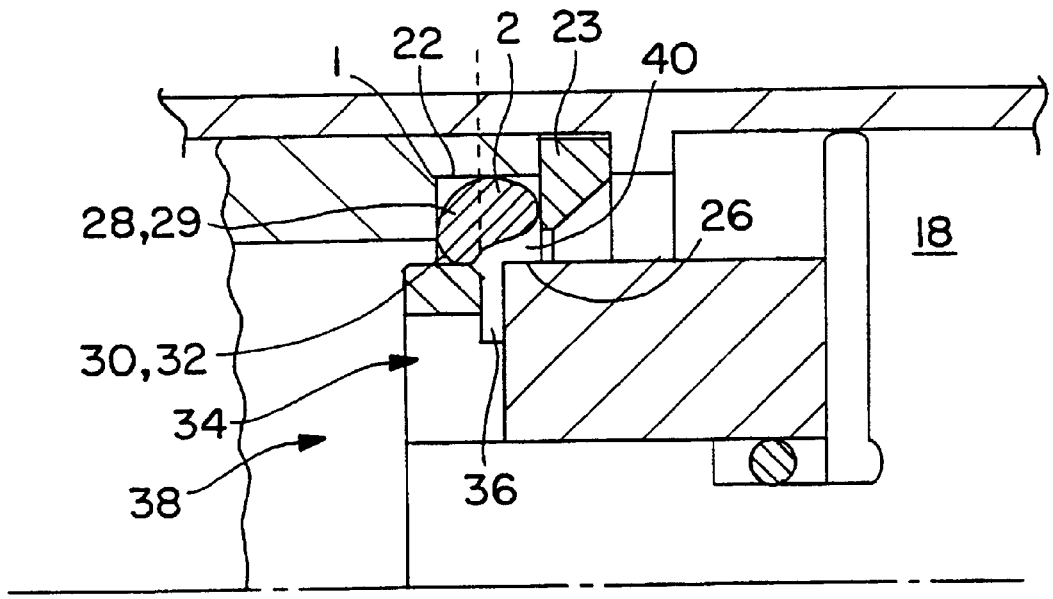
FIGS. 3a & 3b is an enlarged schematic axial sectional view of a fragmental portion of the apparatus shown in FIG. 1 in an open and closed position respectively.
Figure 3B:
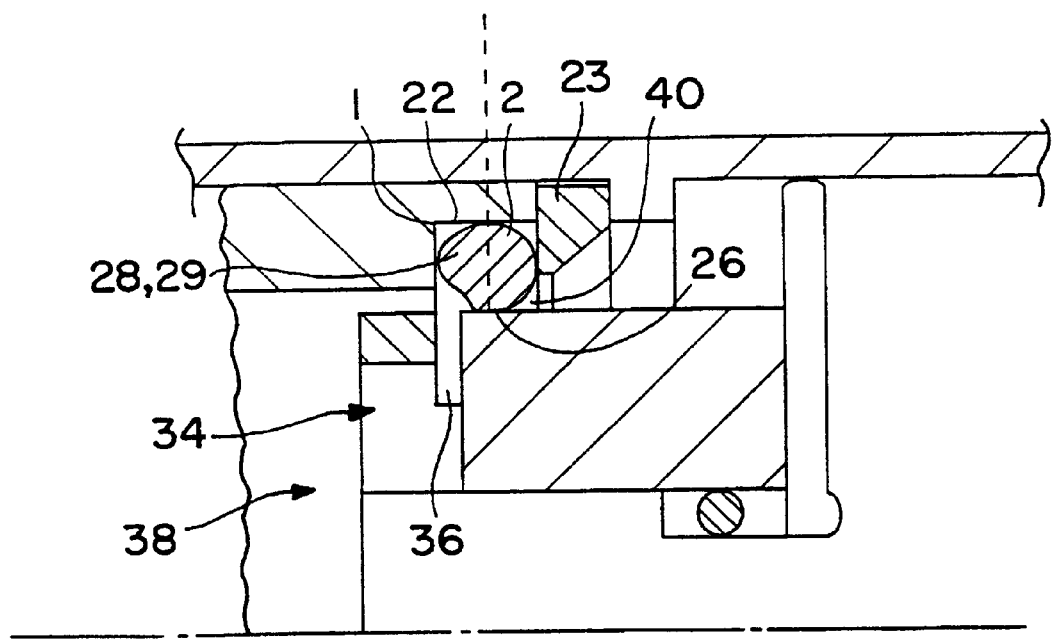

Referring to FIGS. 3A & 3B, the operation of the valve will now be discussed in light of an enlarged depiction of the valving region of valve 10 of FIG. 2. In FIG. 3a, the poppet 14 is shown in the opened position. Consequently, the orifice 36 is substantially proximate to the second portion 2 of the O-ring 29. In the preferred embodiment, the portion of the channelling means 34 that radially extends outward toward the orifice 36 is narrower than the inlet. This causes the exiting fluid to increase in velocity, thereby enabling the channeling means to act as a nozzle or other means for forming a fluid jet. By virtue of the fluid jet radially extending from orifice 36, the O-ring is deformed. This flow, directed radially against O-ring 29, deforms at least a portion of the O-ring substantially to the indicated shape. As can be seen, this deformation promotes formation of a substantially larger annular gap 40 than if vent flow had not been issued from channel 36 against the O-ring. The creation of the annular gap 40 by the exiting fluid flow provides for fast ventilation. Furthermore, as a consequence of the deformation of the O-ring by flow directed against it from channeling means and of the resulting increased annular gap 40, it has been found that poppet vibration, poppet instabilities, screeching noises, and the like, and the associated wear of valve parts are avoided or significantly reduced. These are important advantages of the invention.

FIG. 3B depicts the valve 10 in a closed state. In the closed state, the poppet 14 moves into the closed position wherein the orifice 36 is proximate to the first portion 1 of the O-ring seal 29. Fluid flow in this configuration tends to urge the O-ring against the back-up ring 23 and the interior and exterior sealing surfaces, thus sealing the first cavity from the second cavity. FIG. 3B also shows the preferred embodiment wherein a back-up ring 23 is employed. The back-up ring 23 not only holds the O-ring in place to prevent its axial movement, but also tends to channel fluid around its periphery. This creates a force that urges the seal against the interior sealing surface 22 and reduces the wear on the O-ring caused by it being drawn into the gap 40.

Figure 4:
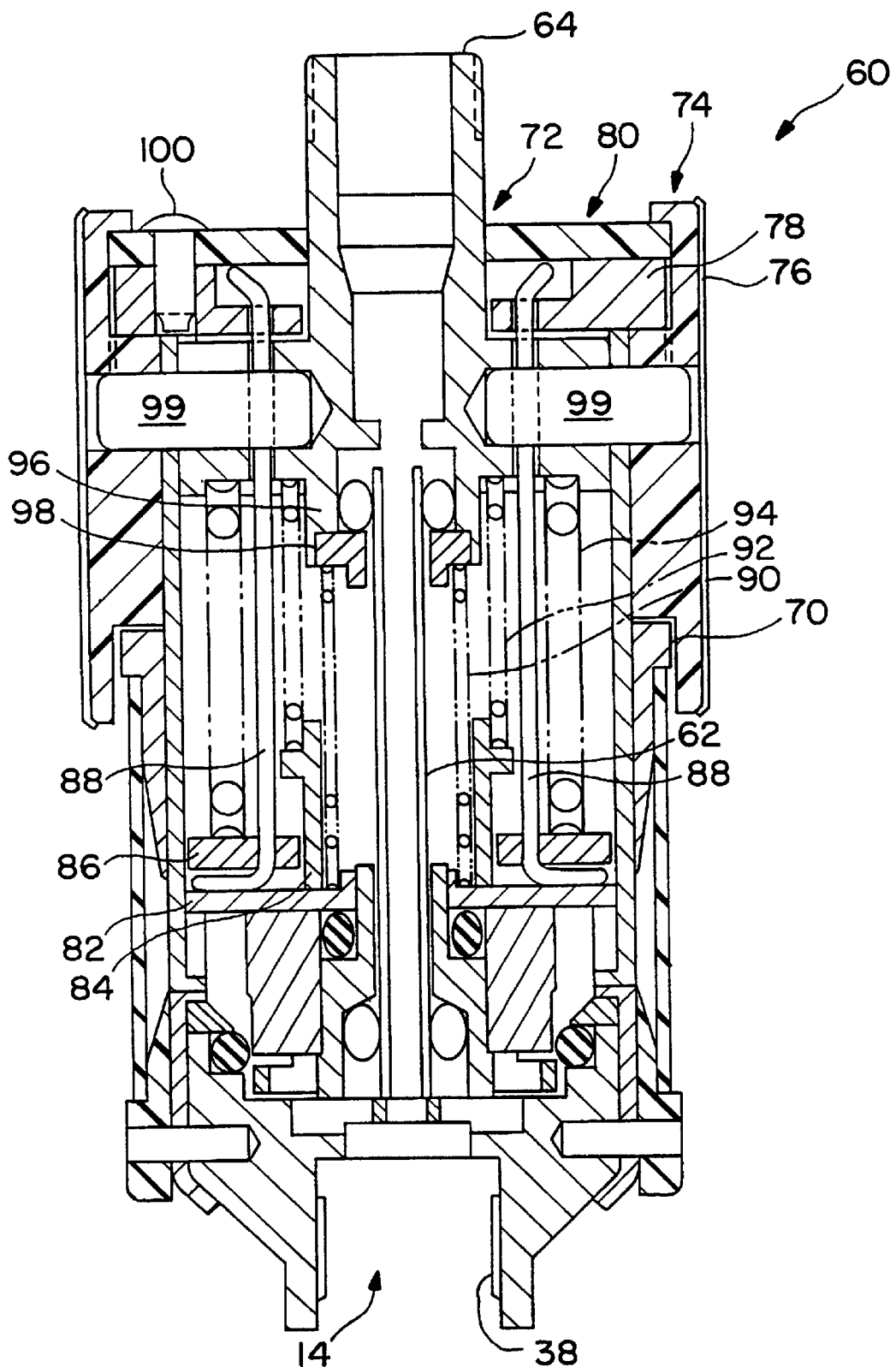
FIG. 4 is a schematic axial sectional view of another embodiment of the apparatus of the invention.
Figure 5:
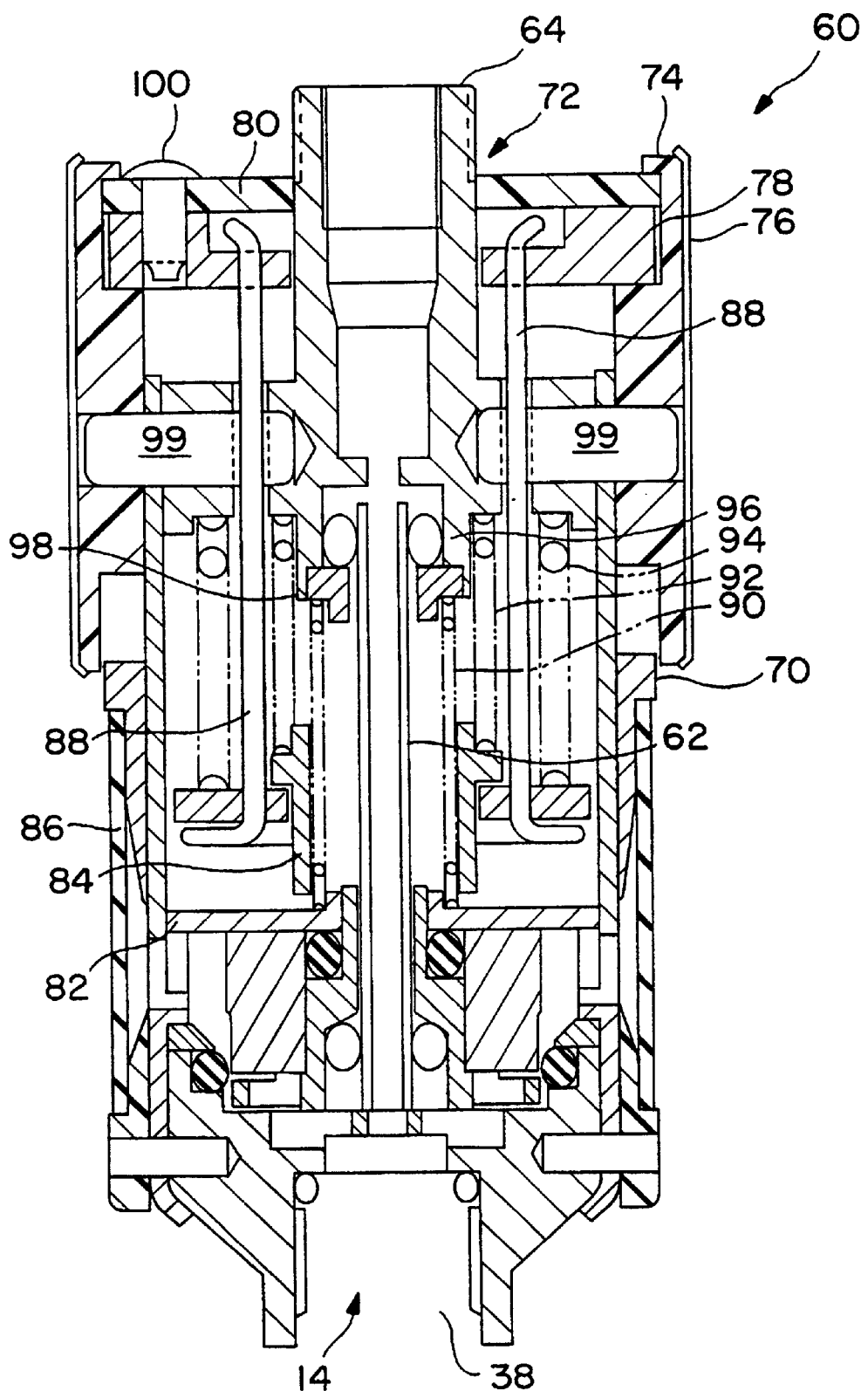
FIG. 5 is a schematic axial sectional view of the apparatus shown in FIG. 4 at a different pressure setting.
Figure 6:
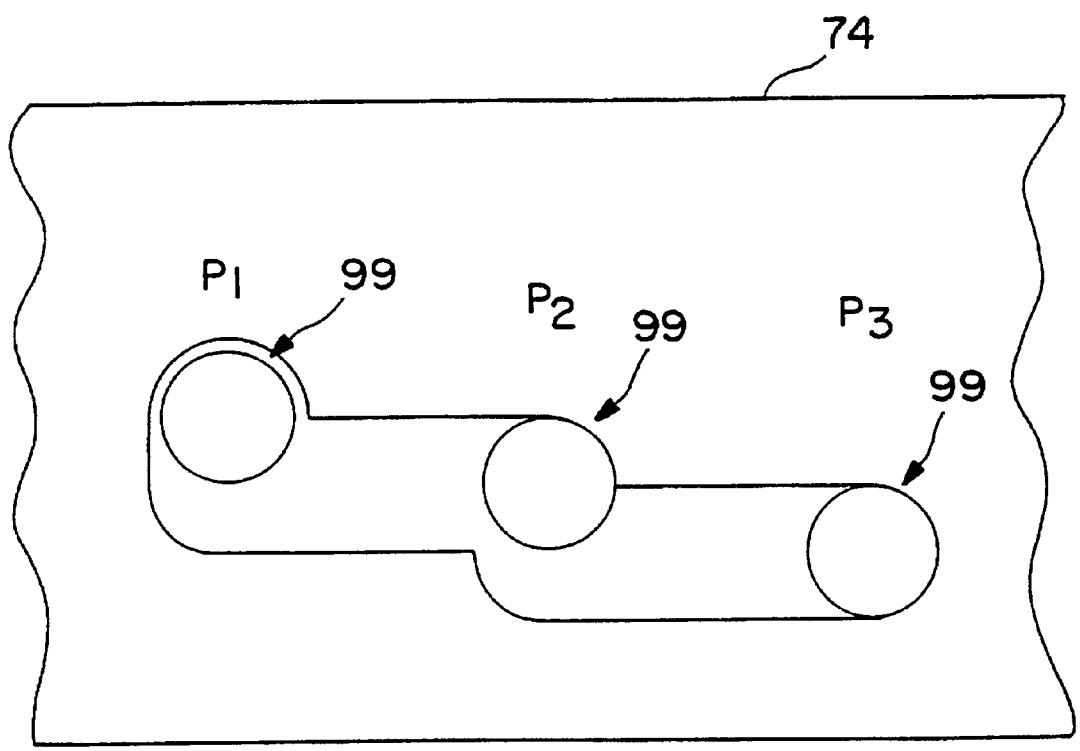
FIG. 6 is a schematic depiction of a portion of a pressure-setting device of the apparatus shown in FIG. 4.

Referring now to FIGS. 4–6, there is shown an embodiment of the invention, namely valve 60, that enables a user to select any one of three predetermined relief pressures and allows inflation through the relief valve 60. In the preferred embodiment, the conventional tire check valve is removed from the tire valve stem and is mounted within the upper inlet stem 64 and relief valve 60 is sealedly mounted upon the tire valve stem. Inflation of the tire can now be performed through inlet stem 64 (through relief valve 60) in a conventional manner. Thus, the means for inflating a tire directly through the relief valve 60 includes inlet stem 64, the axial bore of upper end closure 72, flow tube 62, and mounting and connecting means 38.

The lower portion of the relief valve 60 is substantially identical to the lower portion of the relief valve 10 depicted in FIG. 2, with the exception that push rod 48 (of FIG. 2) is replaced by a flow tube 62 (in FIGS. 4 and 5) that is not axially movable relative to housing 12. As far as the lower portions of the relief valve are concerned, the description provided hereinbefore in regard to the embodiment specified in conjunction with FIGS. 2–3 (relief valve 10) is also applicable to the embodiment shown in FIGS. 4–6.

The remaining central and upper portions of relief valve 60 are of somewhat different structure. As indicated before, valve 60 facilitates choosing one of three possible predetermined spring loading magnitudes for poppet 14. Means for choosing, means for registering and holding, and means for visually displaying a chosen spring loading magnitude include the following components upper outer housing 70, upper end closure 72, cylindrical sleeve cam 74, cam cover 76, spring rod lifter plate 78, upper dirt guard 80, primary guide 82, secondary guide 84, tertiary guide 86, lifter rods 88, primary spring 90, secondary spring 92, tertiary spring 94, flow tube 62, seal 96, upper spring guide 98, dowels 99, and dirt guard rivet 100.

FIG. 4 shows relief valve 60 with all three springs loading poppet 14 downwardly via primary guide 82. Hence the pressure relief setting has the highest magnitude, as the sum of the three spring forces (springs 90,92,94) is in effect. When the cylindrical sleeve cam 74 is lifted and rotated along with the cover 76 from the P1 to the P2 position (see also FIG. 6), cam 74 and thereby also lifter plate 78 are forced upwardly. Lifter rods 88 are thereby raised and, therewith, the tertiary guide 86 disengages the tertiary spring 94 from primary guide 82, and thus, also from the poppet. The spring force acting on the poppet is now only the sum of the forces of the primary spring 90 and the secondary spring 92. Upon lifting and rotating of the cam to the P3 position, the lifter plate 78 is raised further and therewith also lifter rod 88 which causes tertiary guide 86 to contact and raise secondary guide 84 and, thereby, disengage from primary guide 82. The latter state is shown in FIG. 5, wherein only the force of the primary spring 90 remains effective against the poppet.

FIG. 6 schematically illustrates cylindrical sleeve cam 74 (in unrolled flattened depiction) in relation to dowels 99 for the three possible spring loadings of poppet 14 that correspond to the three possible settings of relief pressures (P1, P2, P3). Dowel 99 is shown here in each of the three setting positions for clarity's sake. However, it should be understood that, in actuality, dowel 99 can be disposed only in one of the positions for a particular setting. Means for visually displaying a chosen relief pressure value includes the rotatable cylindrical sleeve cam 74 in relation to dowels 99 and/or in relation to the upper dirt guard 80 together with the externally protruding portion of the upper end closure 72. Suitable visible markings upon exposed surfaces of these components to indicate relative rotational position and therewith the selectable pressure settings provide display of the chosen and the available pressure settings. Although the embodiment depicted herein teaches a valve with predetermined spring settings, it should be understood that an embodiment having a dial for continuous tension settings within a range of minimum and maximum spring settings is well within the scope of the invention.

Figure 7:
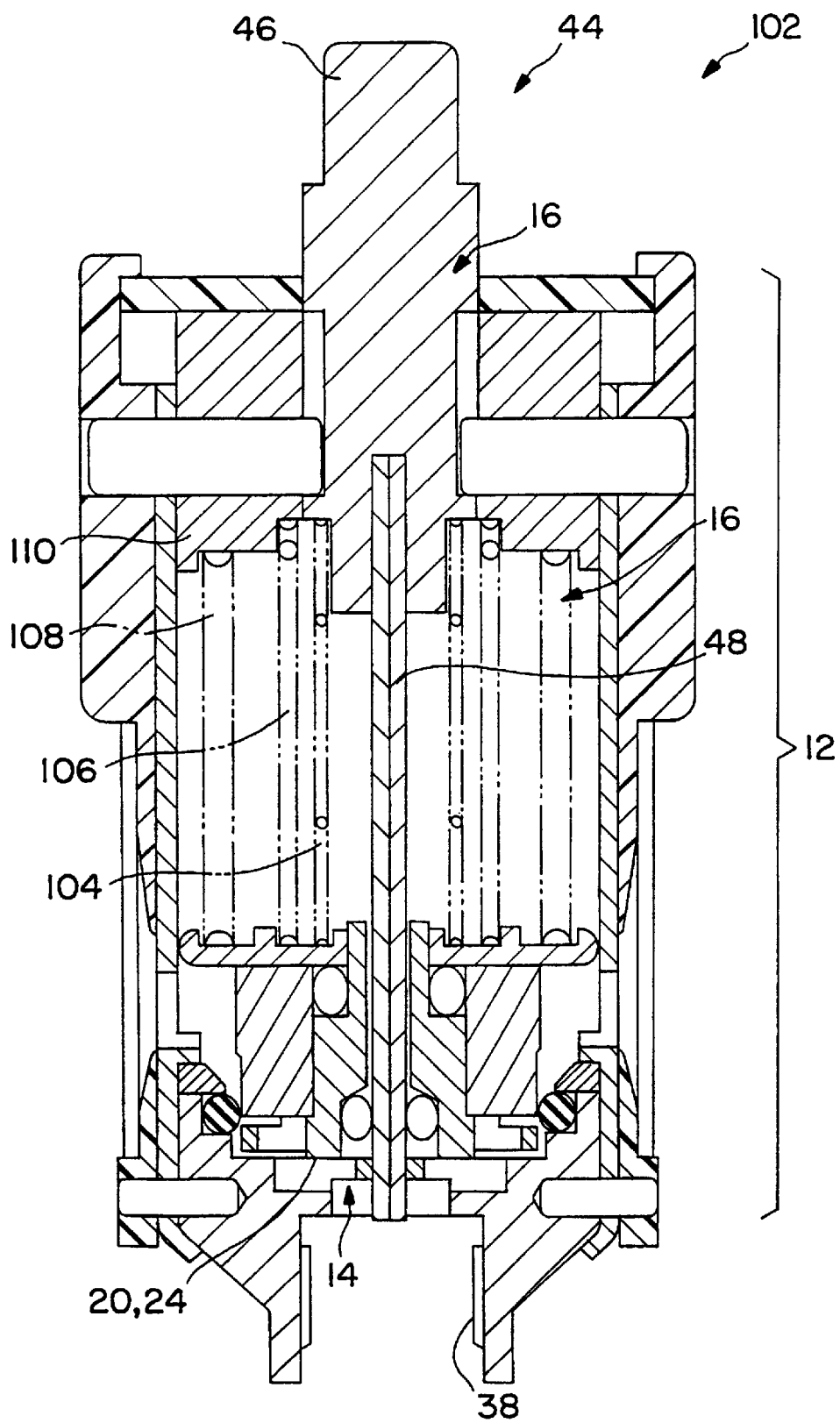
FIG. 7 is a schematic axial sectional view of another embodiment of the invention shown in inactive state.
Figure 8:
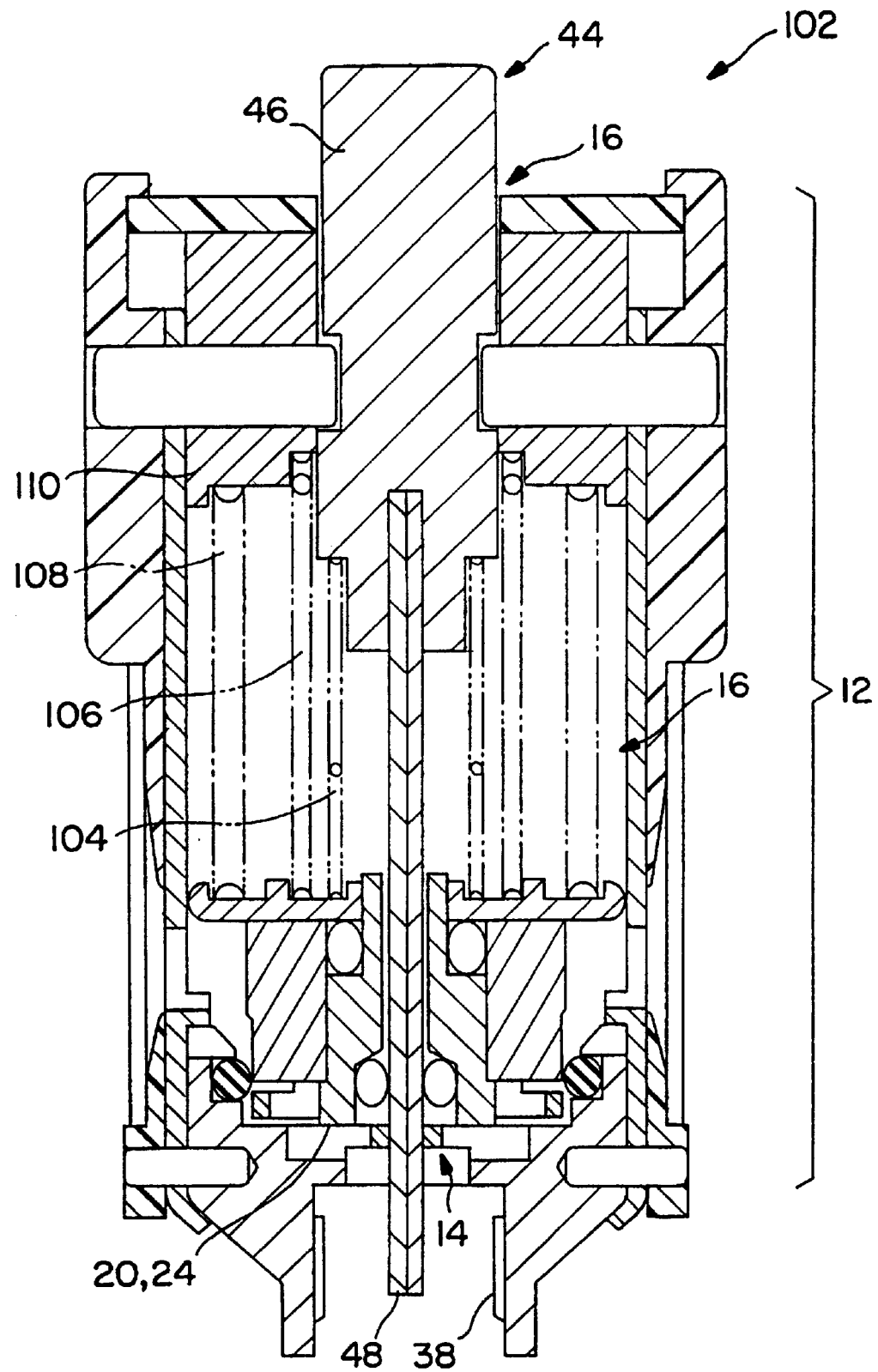
FIG. 8 is a schematic axial sectional view of the apparatus of FIG. 7 shown in active state.

Referring now to FIGS. 7–8, there is depicted another embodiment of the invention in the form of a relief valve 102. Like valve 60, relief valve 102 is substantially identical to the embodiment shown in FIG. 2, and described in conjunction therewith, except for a variation of actuating means. The actuating means 16 comprises an actuating device 44 having an activating pin 46 and a push rod 48 as described in conjunction with FIG. 2, but spring 42 (of FIG. 2) is now replaced by three concentrically disposed springs that act in unison as spring loading means—namely, inner spring 104, central spring 106, and outer spring 108. Spring 104 extends between activating pin 46 and poppet 14 and springs 106 and 108 extend between internal shoulder 110 of housing 12 and poppet 14. Poppet 14 is therefore preloaded axially toward the first cavity within housing assembly 12.

As described in light of FIGS. 4 & 5, employment of multiple springs in this manner facilitates providing different spring-loading magnitudes without a need to stock larger numbers of individual springs of specific spring constants. For instance, if springs 108 and 106 are left out, the relief valve's preset pressure will correspond to a spring loading by spring 104 (when valve 102 is activated by actuating device 44). If spring 104 and one of the springs 106 or 108 are installed, the combined respective spring loadings will be in effect.

Relief valve 102 is shown with housing 12 having mounting and connecting means 38 appropriately adapted for mounting on a tire valve stem that includes a standard tire valve. FIG. 7 shows relief valve 102 in an inactive state; i.e. the tire valve is not opened and the relief valve is not exposed to tire pressure. FIG. 8 shows relief valve 102 in an active state; i.e. the tire valve is opened by the push rod 48 extending into the tire valve stem. Activation is performed manually by pushing down (and twisting) the activating pin 46. In operation, when pressure is relieved from the tire, excess tire pressure forces poppet 14 to lift from seat 20, thereby facilitating relief of container pressure by venting of fluid therefrom in the manner hereinbefore described in conjunction with FIGS. 1–3.

Figure 9:
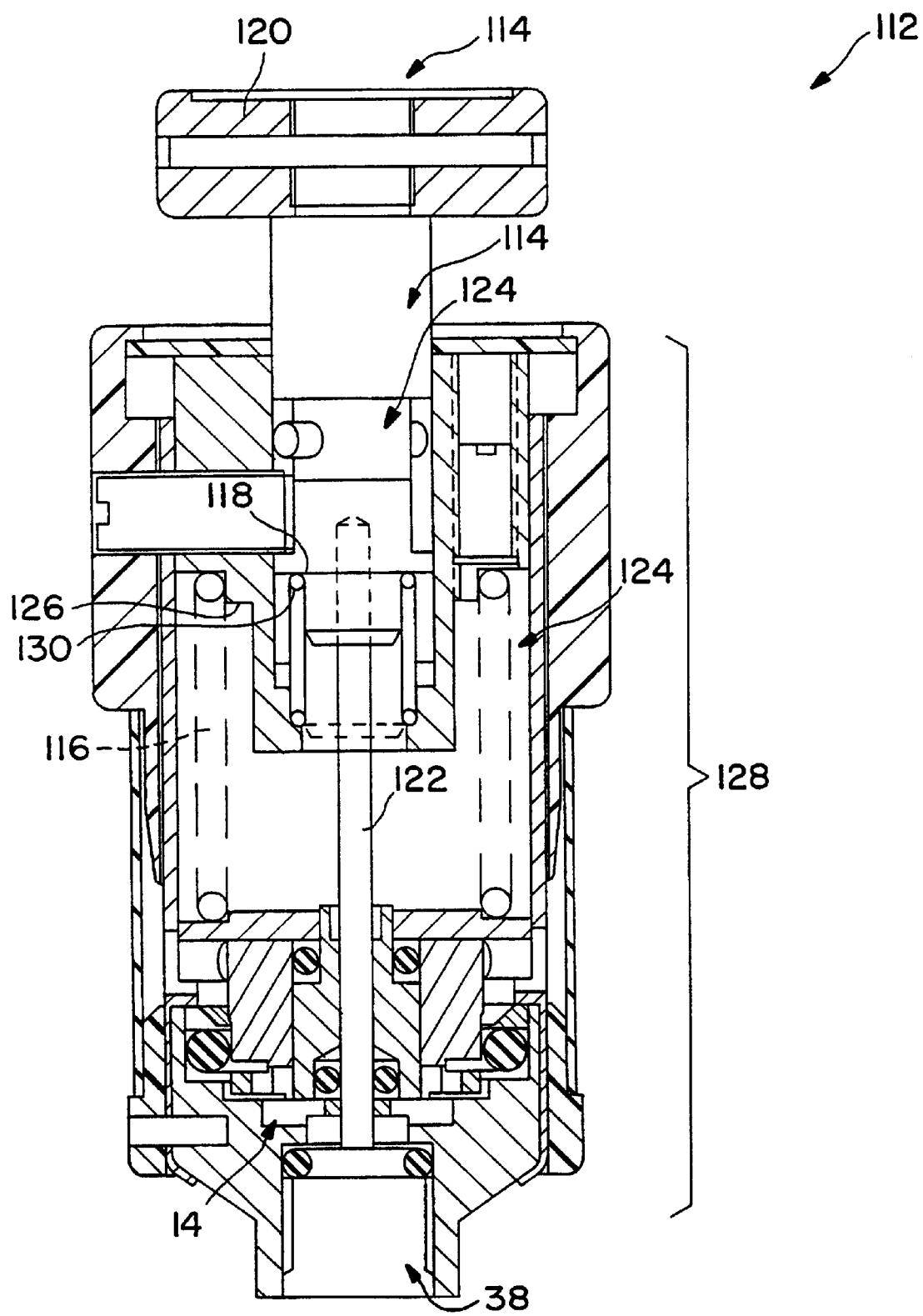
FIG. 9 is a schematic axial sectional view of yet another embodiment of the invention.

Referring now to FIG. 9, relief valve 112 is shown. Relief valve 112 is substantially identical to the embodiment shown in FIG. 2 and described in conjunction therewith except that the actuating device 44 (of FIG. 2) differs somewhat in structure from the actuating device 114 (of FIG. 9) and that spring 42 (of FIG. 2) is now replaced by a spring 116. In this embodiment, actuating device 114 also includes an activating pin 118 having a knob 120 attached at one end, a push rod 122 affixed to the other end of pin 118, and spring loading and locking means 124 disposed in the region of the lower end of pin 118.

In FIG. 9, spring 116 extends between shoulder collar 126 (part of housing assembly 128) and poppet 14. Poppet 14 is thus preloaded axially downward within housing assembly 128. Spring loading and locking means 124 includes a spring 130 that extends between shoulder 126 and activating pin 118. Activating pin 118 is consequently spring loaded upwardly (toward its inactive position).

Relief valve 112 is shown with housing assembly 128 having mounting and connecting means 38 appropriately adapted for mounting on a tire valve stem that includes a standard tire valve. FIG. 9 shows relief valve 112 in an inactive state; i.e. the tire valve is not opened and the relief valve is not exposed to tire pressure. In order to activate valve 112, knob 120 is manually depressed and twisted. Consequently, a tire valve is opened by the push rod 122 extending into the tire valve stem. Hence, the first cavity of the poppet assembly 14 is thereby exposed to tire pressure. In operation, when pressure is relieved from the tire, excess tire pressure forces poppet 14 to lift upwardly, thus relieving container pressure by venting of fluid as described in conjunction with FIG. 2.

Figure 10:
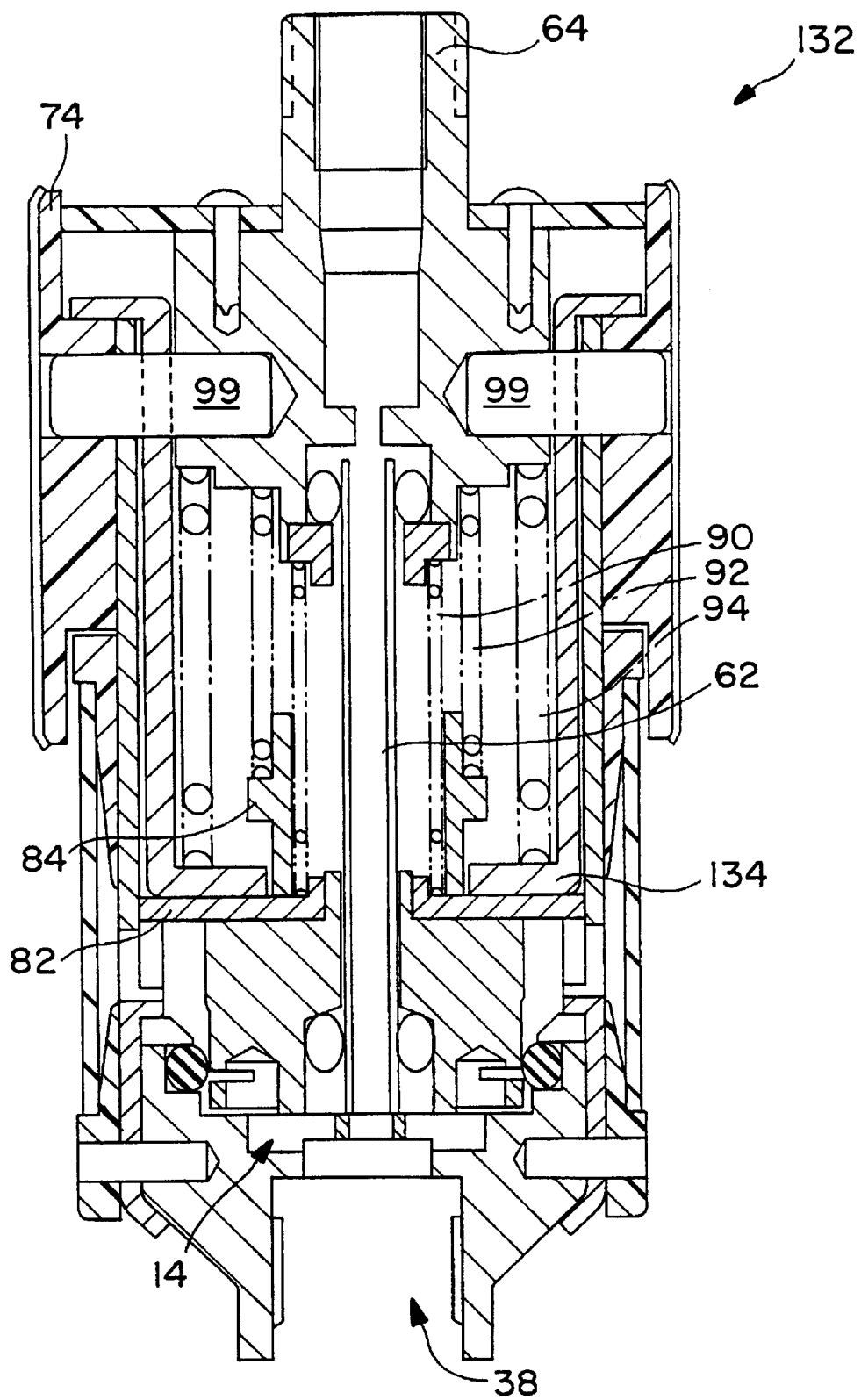
FIG. 10 is a schematic axial sectional view of a further embodiment of the invention at a higher pressure setting.
Figure 11:
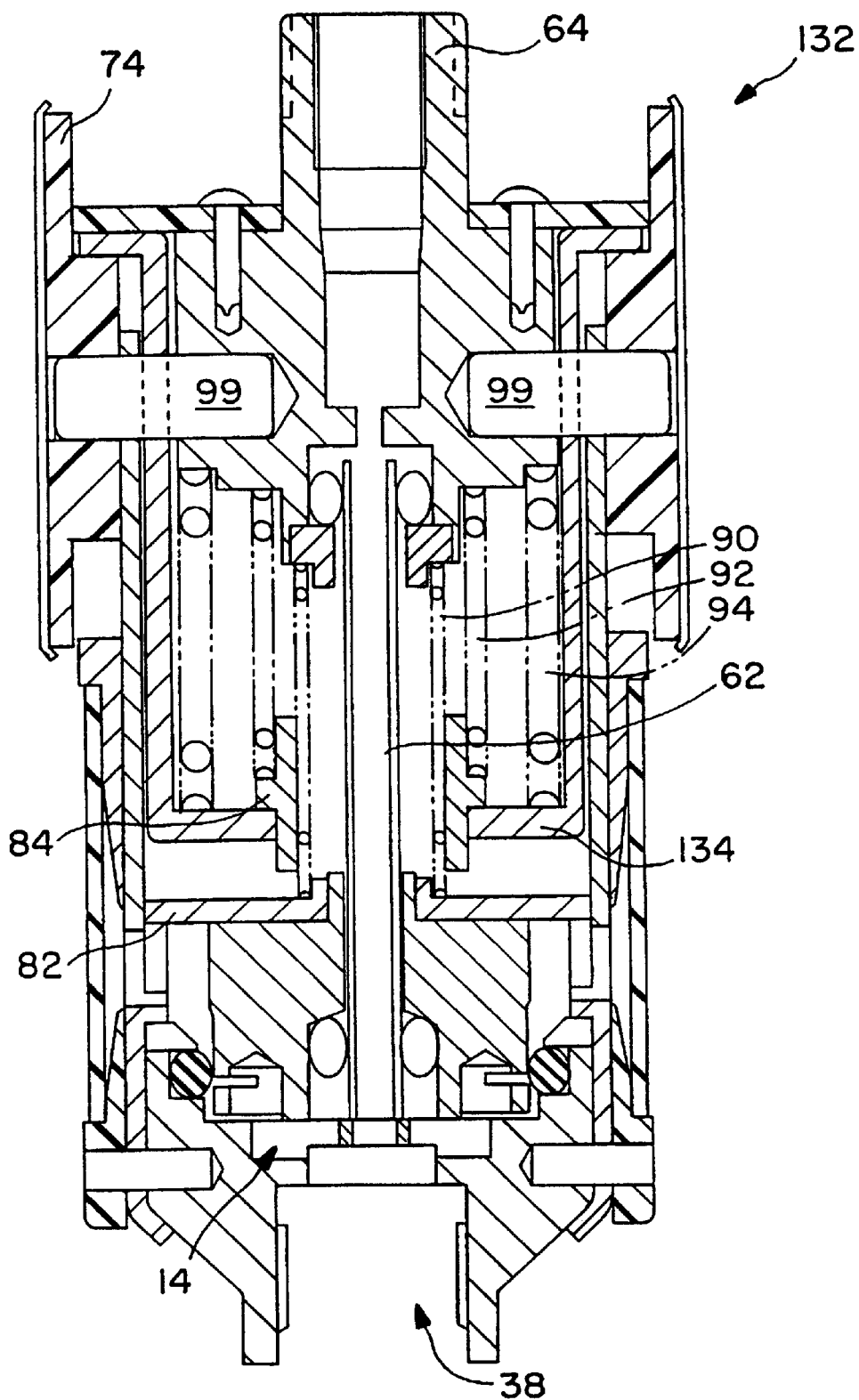
FIG. 11 is a schematic axial sectional view of the apparatus of FIG. 10 shown at a lower pressure setting.

Referring now to FIGS. 10 and 11, there is shown another embodiment, namely relief valve 132, which provides for tire inflation through the valve and for selective setting to any one of three predetermined relief pressures. Structurally and functionally, valve 132 is substantially identical to the valve described in conjunction with FIGS. 4–6 with the exception of the actuating means, particularly, the arrangement of lifter rods 88 and tertiary guide 86 (for tertiary spring 94). These lifter rods and the guide are replaced in FIGS. 10 & 11 by a lifter cup 134 that is slotted for dowels 99. Cup 134 provides substantially the same function as the components it has replaced.

Referring to FIG. 10, the relief valve 132 is shown with all three springs loading poppet 14 downwardly. Hence the pressure relief setting has the highest magnitude, as the sum of the three spring forces (springs 90,92,94) is in effect. When the cylindrical sleeve cam 74 is lifted and rotated along with the cover 76 from the P1 to the P2 position (see also FIG. 6), cam 74 and lifter cup 134 are forced upwardly. Tertiary spring 94 is thereby disengaged from primary guide 82 and thusly also from the poppet 14. The spring force acting on the poppet is now only the sum of the forces of the primary spring 90 and the secondary spring 92. Upon lifting and rotating of the cam to the P3 position, lifter cup 134 is raised further and lifts secondary guide 84, whereby also the secondary spring 92 is disengaged from primary guide 82 and therewith also from poppet 14. The latter state is shown in FIG. 11, wherein only the force of the primary spring 90 remains effective against the poppet.

Valve 132 also includes a sleeve cam 74 that is substantially identical to cam 74 of relief valve 60 and that functions identically. In this respect, referring back to FIG. 6, there is schematically illustrated cylindrical sleeve cam 74 (in unrolled flattened depiction) in relation to dowels 99 for the three possible spring loadings of poppet 14 that correspond to the three possible settings of relief pressures (P1, P2, P3). As indicated hereinbefore, valve 132 facilitates choosing one of three possible predetermined spring loading magnitudes for poppet 14. Means for choosing, means for registering and holding, and means for visually displaying a chosen spring loading magnitude include the above components.

During installation on a tire, the conventional tire check valve is removed from the tire valve stem and is mounted within the uppermost inlet stem 64. Relief valve 132 is then mounted (by means 38) upon the tire valve stem. Inflation of the tire can now be performed through inlet stem 64 (through relief valve 132) in conventional manner. Thus, the means for inflating a tire directly through the relief valve 132 includes inlet—stem 64, flow tube 62, and mounting and connecting means 38.

Figure 12:
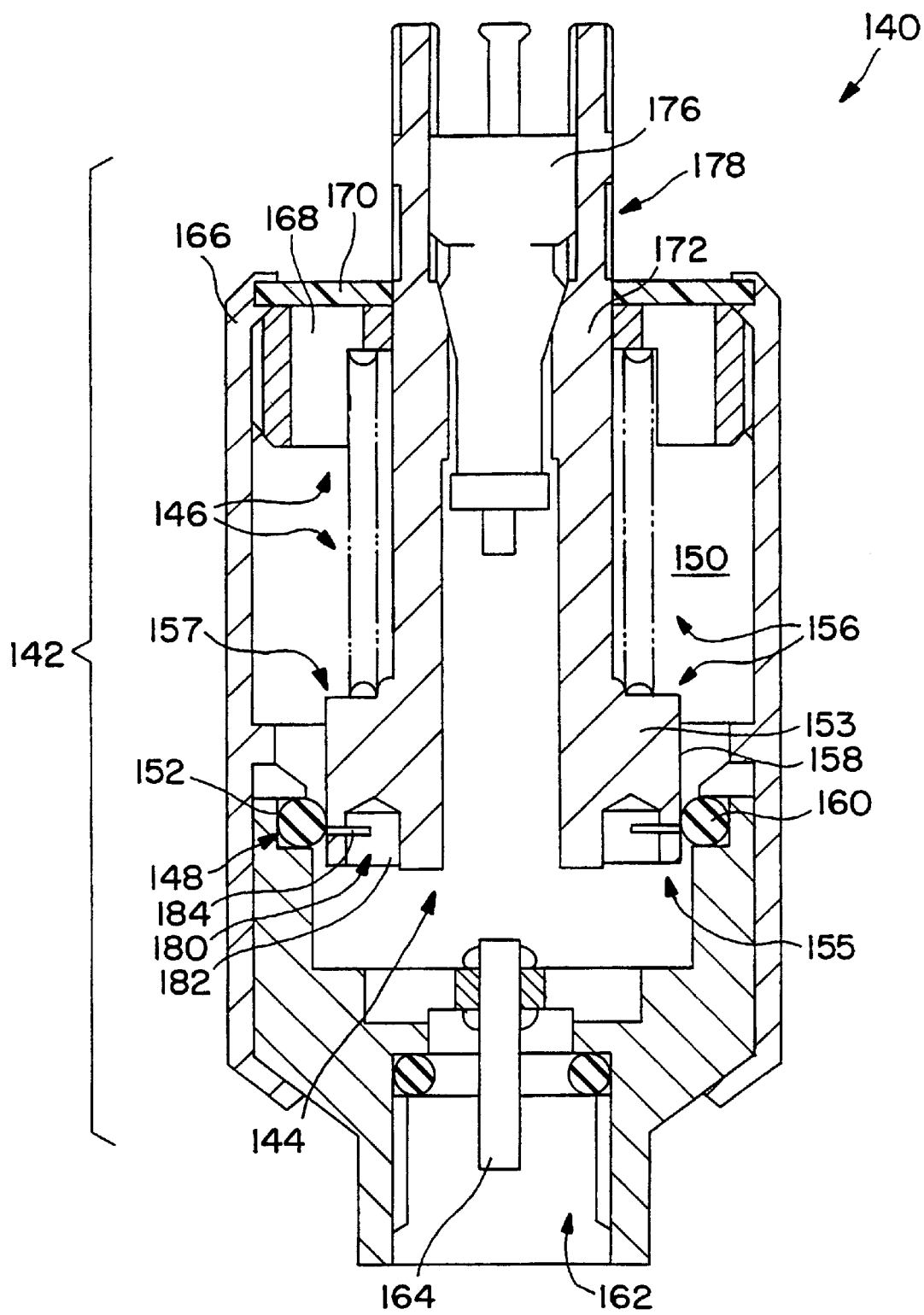
FIG. 12 is a schematic axial sectional view of yet a further embodiment of the invention shown in active state at regulated pressure value (and indicating this value)
Figure 13:
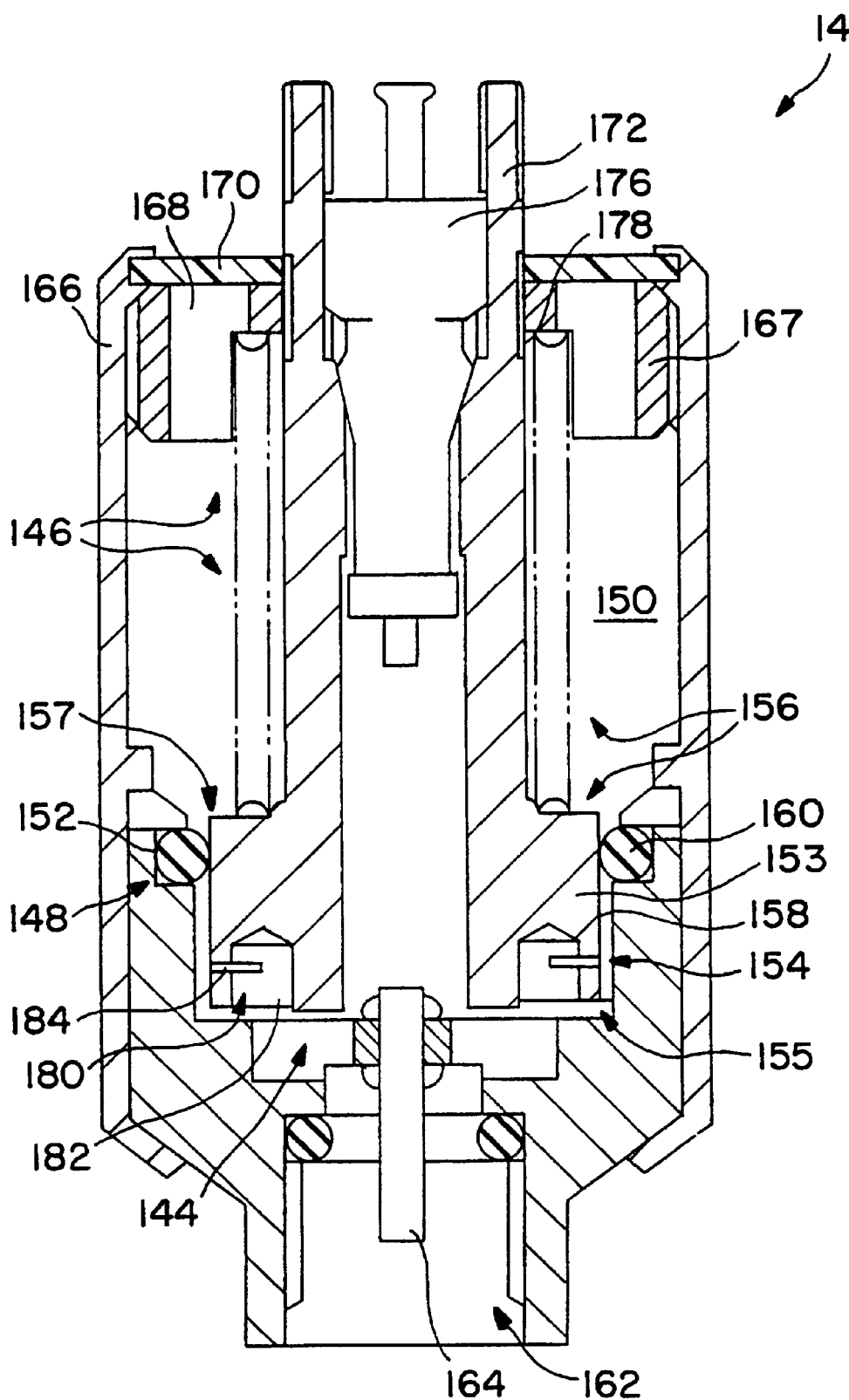
FIG. 13 is a schematic axial sectional view of the apparatus of FIG. 12 shown in active state at a subnormal pressure value (and indicating this value)

Referring now to FIGS. 12 and 13, there is depicted another embodiment, namely relief valve 140 that provides excess pressure relief, pressure indication, and fill-through capability. Relief valve 140 comprises a housing 142, a poppet 144, spring loading means 146, and sealing means 148. Housing 142 includes a cavity 150 and therein a cylindrical internal seal surface 152. Poppet 144 is coaxially movable within cavity 150 and includes a body 153 having a valving region 154 at its lower axial end (first axial end 155) and a loading region 156 at a second axial end 157 spaced axially upwardly from valving region 154. Poppet 144 includes in the valving region 154 a cylindrical exterior sealing surface 158 that extends between the valving region 154 and the loading region 156.

Sealing means 148 includes an O-ring 160 of resilient material. The O-ring 160 is disposed and retained upon internal seal surface 152 and is shown while sealing against exterior sealing surface 158 (in FIGS. 12,13). Housing 142 further comprises connecting means 162 at the lowest end for mounting and sealedly connecting valve 140 to a tire valve stem. Means 162 includes an actuator rod 164 to push against the valve of a standard tire valve and thereby open the tire valve while the relief valve 140 is affixed to the tire valve stem. Thus, connecting means 162 can also act as actuating means in that it exposes the bottom end of poppet 144 to tire pressure.

Housing 142 also comprises an outer casing 166 and threaded thereon is an upper flange 167 having vent openings 168 and a vent cover 170 to protect against entry of dirt. Vent cover 170 is of a resilient material and can include normally closed slits that open in response to vent pressure to release flow outwardly to ambient, yet dirt is prevented from entering as the slits close in the absence of internal, vent pressure. Cover 170 can be provided without such slits and rely upon its elastic properties to release vent flow by opening an annular area at its middle periphery in response to internal vent pressure. Upper flange 167 serves to support the upper end of the compression spring of spring loading means 146. The threaded fastening of flange 167 in casing 166 of housing 142 permits fine adjustment of the spring loading, for instance during tests on assembly of the valve.

Poppet 144 also includes an extension 172 that reaches to the outside of housing 142 and extends beyond the housing's uppermost end. An axial conduit or bore 174 extends throughout the length of poppet 144. The uppermost end of extension 172 is formed internally and externally identically to a conventional tire valve stem to facilitate screwing in of a standard tire valve 176 and to provide an appropriate coupling facility to a pneumatic hose to inflate a tire through relief valve 140. Extension 172 includes markings 178 that serve to indicate visually fluid pressure conditions in a tire (by their position in relation to housing 142).

Poppet 144 includes means for bypassing the O-ring seal 160 (of sealing means 148) when excess pressure is being relieved. The bypassing means includes a bypass passage 180 that leads from the region beneath the lower axial surface of poppet 144 to exterior sealing surface 158. Bypass passage 180 includes a conduit in the form of at least one bore 182 and a substantially radially directed channel 184 leading therefrom through surface 158. Channel 184 acts as means for forming a fluid jet directed against O-ring 160 when fluid flows therethrough.

For the purpose of describing operation of relief valve 140, let us assume that valve 140 is connected to a tire valve by connecting means 162 and that poppet 144 is therefore exposed to tire pressure (from beneath).

Relief valve 140 is shown in FIG. 12 in an active state corresponding to a desired normal tire pressure; i.e. the valve is closed and markings 178 indicate presence of this normal pressure. Spring loading means 146 is preset to exert onto poppet 144 a downward spring loading force that balances the upwardly-acting tire pressure if the tire pressure is of the desired normal magnitude. In other words, means for force-balancing the poppet includes the downwardly-acting force of spring loading means 146 and the upwardly-acting force of the tire pressure. The force balancing operation includes the axial movement of poppet 144 in a direction so as to diminish the force difference; the force difference being defined as the difference between the spring force (loading means 146) and the pressure force due to tire pressure. Means for exposing the poppet 144 to tire pressure includes actuator rod 164 and connecting means.

Supposing that valve 140 has just been attached to a tire containing excess pressure (above desired normal pressure) therein or that the pressure in the tire has been raised to excess after valve 140 has been attached thereto. Excess pressure will force poppet 144 upwardly from the shown position. Flow exiting out of channel 184 at the sealing surface 158 in valving region 154 will move upwardly so as to produce a gap between sealing surface 158 and O-ring 160, i.e. this gap opens in a direction toward cavity 150. Consequently, fluid flow (relief flow) from the tire will pass through passage 180, through the gap, through cavity 150, and via vent openings 168 through or past vent cover 170 to ambient. As the excess tire pressure quickly diminishes to the normal pressure level, poppet 144 will be forced downwardly again by spring loading means 146; channel 184 will no longer bypass sealing means 148 (O-ring 160); venting of tire flow will cease; and, relief valve 140 will again attain the force-balanced state shown in FIG. 12.

Referring now to FIG. 13, relief valve 140 is shown here in an active state corresponding to a subnormal tire pressure; i.e. the valve is closed and the relative position of markings 178 (almost hidden) indicate presence of this subnormal pressure. As depicted, the compression spring of spring loading means 146 forces poppet 144 downwardly against the subnormal pressure until force-balancing results or until poppet 144 reaches the bottom stop of its travel. Hence, a visual indication corresponding to the tire pressure is provided by the protrusion of extension 172 (or of marking 178) relative to housing 142.

A tire provided with relief valve 140 that indicates subnormal pressure can be re-inflated through poppet extension 172 (and valve 176) to desired normal pressure. Should excess pressure result during inflation (as it often happens), relief valve 140 will relieve the excess pressure, as described before particularly in conjunction with FIGS. 3a and 3b.

Referring now to FIGS. 14–17, there is illustrated yet a further embodiment of the invention, namely relief valve 190, that provides for selective setting to any one of three predetermined relief pressures and provides tire pressure indication. In many structural and functional aspects, relief valve 190 is similar to relief valve 132 discussed in conjunction with FIGS. 10 and 11. A significant difference, however, is that valve 190 does not offer a fill-through capability, but provides pressure indication. Relief valve 190 comprises a housing 192, a poppet 194, spring loading means 196, and sealing means 198. Housing 192 includes a cavity 200 and therein a cylindrical, internal seal surface 202. Poppet 194 is coaxially movable within cavity 200 and includes a body 203 having a valving region 204 at its lower axial end (first axial end 205) and a loading region 206 at its second axial end 207 spaced axially upwardly therefrom. Poppet 194 includes in the valving region 204, a cylindrical exterior sealing surface 208 that extends between the valving region 204 and the loading region 206.

Sealing means 208 includes an O-ring 210 of resilient material. O-ring 210 is disposed and retained upon an internal seal surface 202 and is shown while sealing against exterior sealing surface 208. Housing 192 further comprises connecting means 212 at the lowest end for mounting and sealedly connecting valve 190 to a tire valve stem. Means 212 includes an actuator rod 214 to push against the valve of a standard tire valve and thereby open the tire valve while the relief valve 190 is affixed to the tire valve stem.

Housing 192 also comprises an outer casing 216 and fastened thereon is an upper flange 217. Radial vent openings 218 are provided in casing 216. A vent cover 220 in form of a cylindrical shell of elastic material (for instance rubber) to protect against entry of dirt is disposed about outer casing 216. Expandable vent cover 220 is of resilient material and can include normally closed slits that open in response to vent pressure to release flow outwardly to ambient, yet dirt is prevented from entering as the slits close in the absence of internal vent pressure. Cover 220 can be provided without such slits and rely upon its elastic properties to release vent flow by opening at one or both of its ends in response to internal vent pressure. Upper flange 217 serves to support the upper ends of compression springs 221, 221', 221" of spring loading means 196.

Poppet 194 also includes an extension 222 that reaches to the outside of housing 192 and extends beyond flange 217 at the housing's uppermost end. Extension 222 can include peripheral markings 228 to visually indicate (by their position in relation to flange 217) fluid pressure conditions in a tire. Poppet 194 includes means for bypassing the seal provided by O-ring 210 (of sealing means 198). This bypassing means comprises a bypass passage 230 that leads from the region beneath the lower axial face of poppet 194 to exterior sealing surface 208. Bypass passage 230 includes a conduit in the form of at least one bore 232 and a substantially radially directed channel 234 leading therefrom through face 208.

Figure 14:
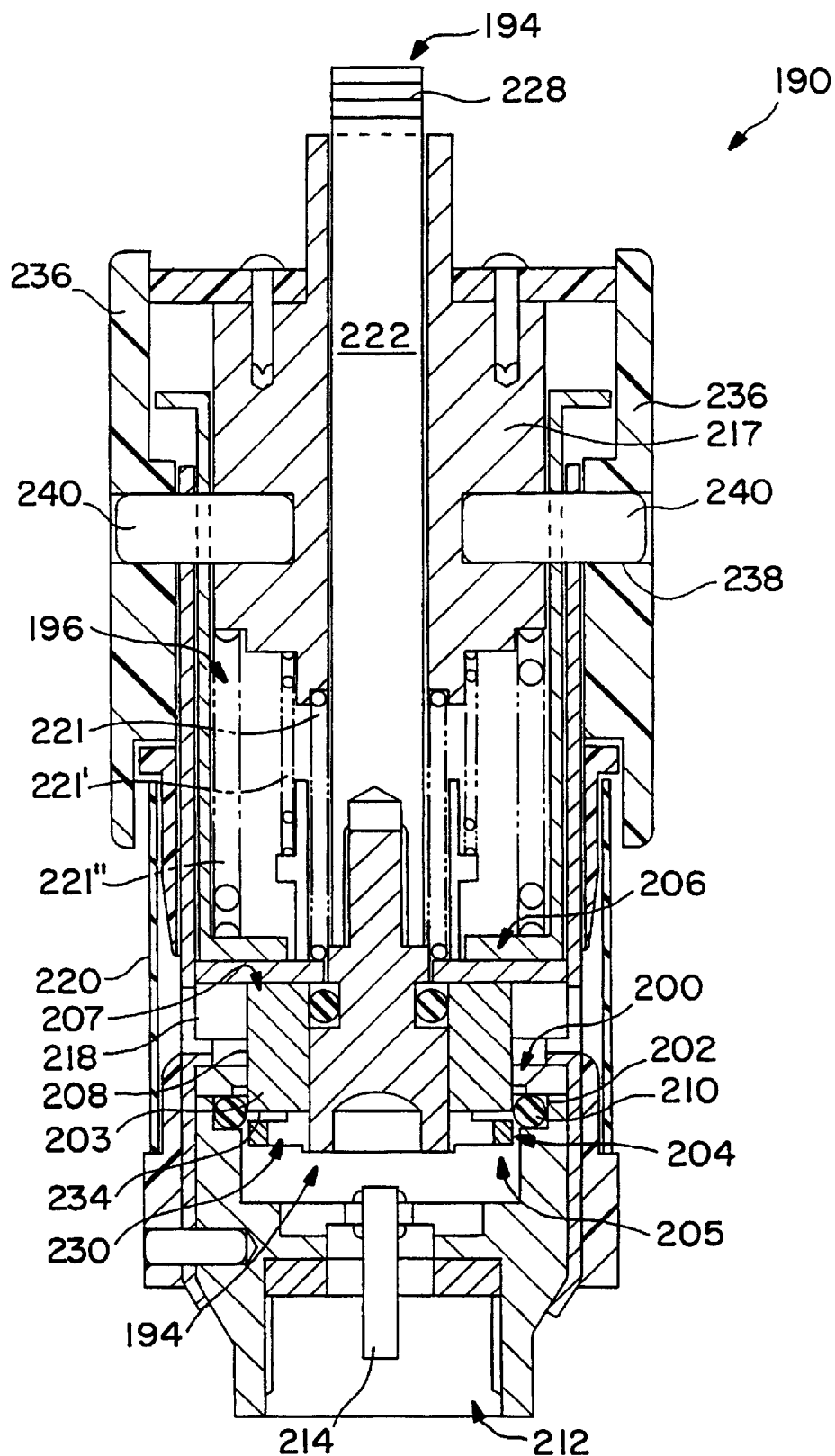
FIG. 14 is a schematic axial sectional view of still another embodiment according to principles of the invention shown in active state with a higher pressure setting at regulated pressure value (and indicating this value)

For the purpose of describing operation of relief valve 190, assume that valve 190 is connected to a tire valve by connecting means 212 and that poppet 194 is therefore exposed to tire pressure (from beneath). Relief valve 190 is shown in FIG. 14 in an active state corresponding to a desired normal tire pressure; i.e. the valve is closed and markings 228 indicate presence of this normal pressure. Force-balancing means comprises spring loading means 196 to exert onto poppet 194 a downward spring loading force and the upwardly-acting force of the tire pressure. The force-balancing operation includes the axial movement of poppet 194 in a direction so as to diminish the force difference; the force difference being defined as the difference between the spring force (loading means 196) and the pressure force due to tire pressure. Means for exposing the poppet 194 to tire pressure includes connecting means 212 and actuator rod 214. As shown in FIG. 14, all three springs (221,221',221") are active and force poppet 194 downwardly—the downward force being balanced by the force due to the tire pressure that acts onto the poppet in upward direction.

Supposing that valve 190 has just been attached to a tire containing excess pressure (above desired normal pressure) therein or that the pressure in the tire has been raised to excess after valve 190 had been attached thereto. Excess pressure will force poppet 194 upwardly from the shown position. Flow exiting out of channel 234 at the sealing surface 208 in valving region 204 will move upwardly so as to produce a gap between sealing surface 208 and O-ring 210, i.e. this gap opens in direction toward cavity 200. Consequently, fluid flow (relief flow) from the tire will pass through passage 230, through the gap, into cavity 200, and via vent openings 218 through or past vent cover 220 to ambient. As the excess tire pressure quickly diminishes to the normal pressure level, poppet 194 will be forced downwardly again by spring loading means 196, flow through channel 234 will no longer be able to bypass sealing means 198 (O-ring 210), venting of tire flow will cease, and relief valve 190 will again attain the balanced state shown in FIG. 14.

Figure 15:
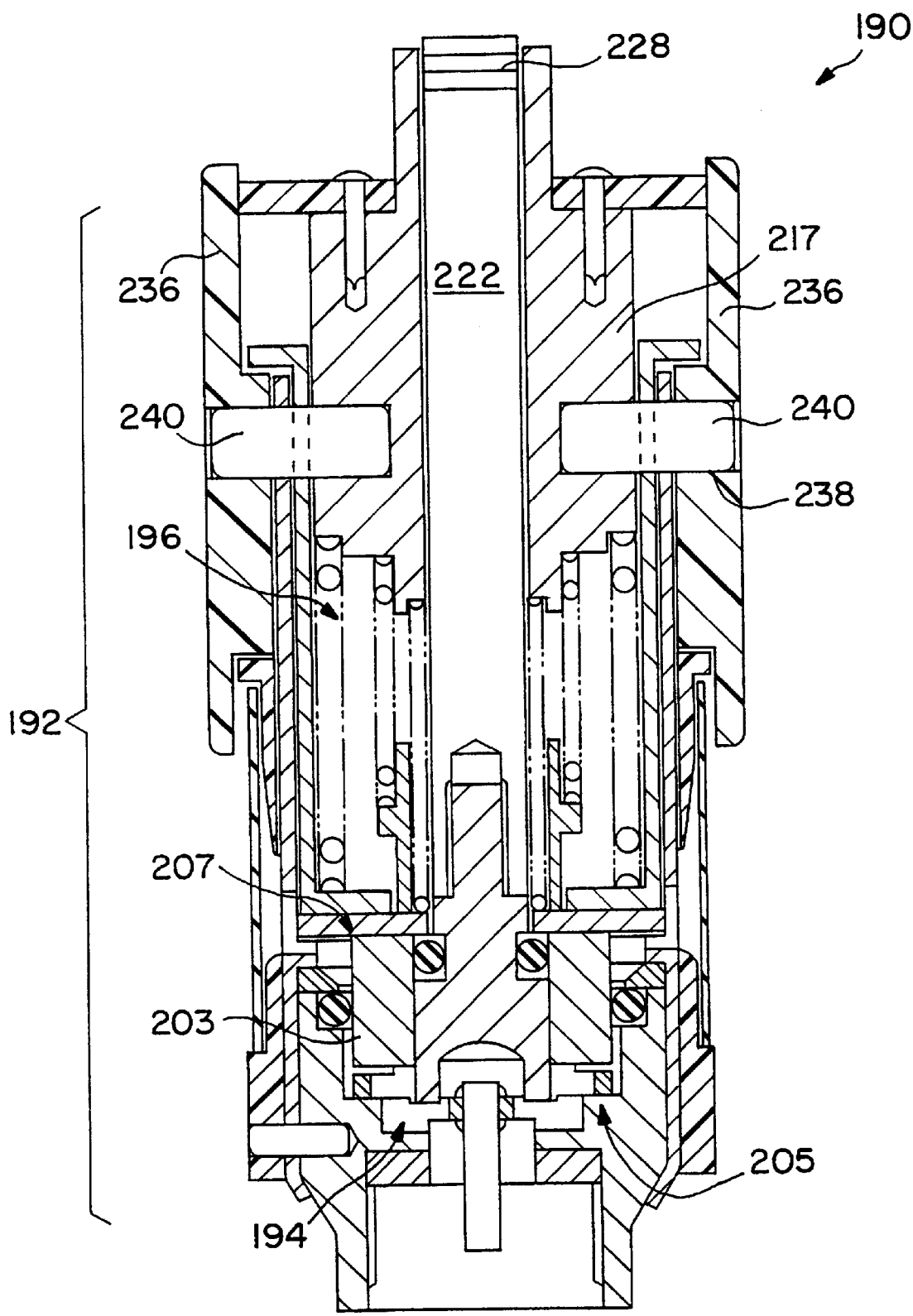
FIG. 15 is a schematic axial sectional view of the apparatus of FIG. 14 shown in active state with a higher pressure setting at a subnormal pressure value (and indicating this value)

Referring now to FIG. 15, relief valve 190 is shown here in an active state corresponding to a subnormal tire pressure; i.e. the valve is closed and the relative position of markings 228 (almost hidden) indicate presence of this subnormal pressure (or absence of any pressure). As depicted, the compression springs of spring loading means—196 force poppet 194 downwardly against the subnormal pressure until force-balancing results or until poppet 194 reaches the bottom stop of its travel. Hence, a visual indication corresponding to the tire pressure is provided by the protrusion of extension 222 (or of marking 228) relative to housing 192 (flange 217).

Figure 16:
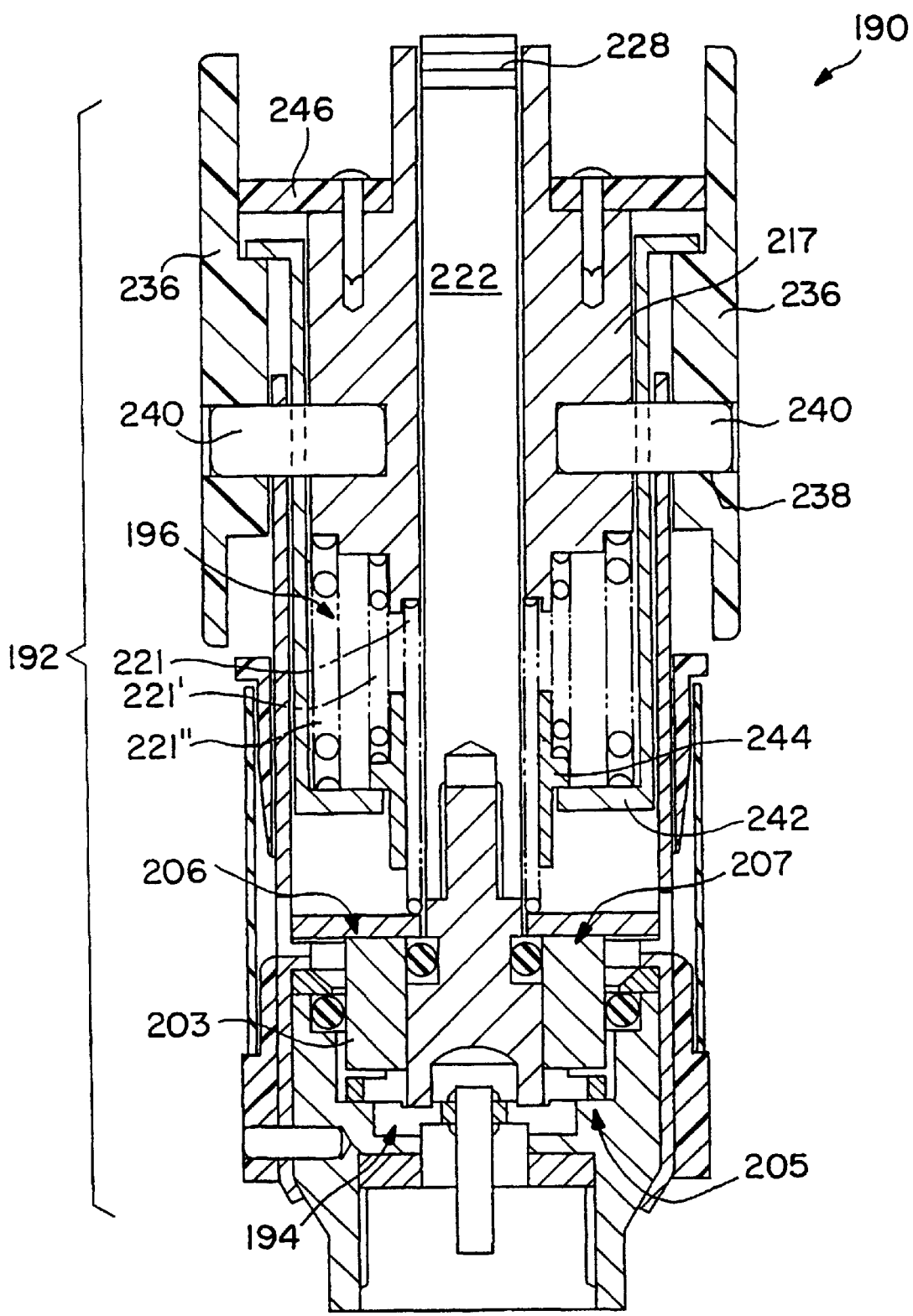
FIG. 16 is a schematic axial sectional view of the apparatus of FIG. 14 shown in active state with a lower pressure setting at a subnormal pressure value (and indicating this value)

Referring now to FIG. 16, relief valve 190 is set to a low relief pressure setting whereby only primary spring 221 is in effect. Relief valve 190 is depicted in an active state corresponding to a subnormal tire pressure or to absence of any pressure. Housing 192 includes a cylindrical sleeve cam 236 that has shaped slots 238. Flange 217 is provided with radial pins 240 that reach through slots 238 along which cam 236 can be slidingly rotated.

Figure 17:
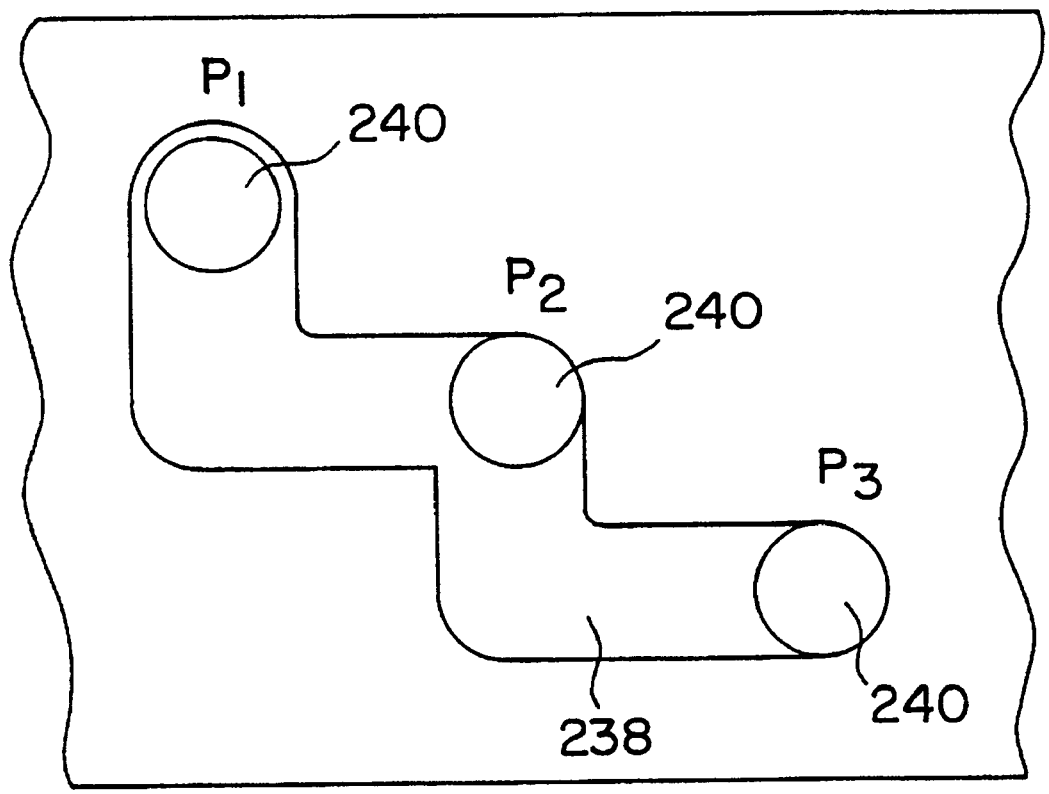
FIG. 17 is a schematic depiction of a portion of a pressure-setting device of the apparatus shown in FIG. 14.

Referring now also to FIG. 17, there is schematically illustrated cylindrical sleeve cam 236 (in unrolled flattened depiction) in relation to pins 240 for the three possible spring loadings of poppet 194 that correspond to the three possible settings of relief pressures (P1, P2, P3). As indicated hereinbefore, valve 190 facilitates selecting one of three possible predetermined spring loading magnitudes for poppet 194. Means for choosing, means for registering and holding, and means for visually displaying a selected spring loading magnitude include the above components. In contrast with the illustration of cam 74 in FIG. 6, the depiction of cam 236 in FIG. 17 reflects the increased lift travel between the pressure settings which is required to suit the increased axial travel of poppet 194 due to the provision for pressure indication (by relative position of poppet extension 222 versus flange 217 of housing 192).

With respect to the low pressure setting (P3) of valve 190 illustrated in FIG. 16, it can be seen that only spring 221" remains engaged against loading region 206 of poppet 194 while the bottom ends of springs 221 and 221' are disengaged and lifted upwardly by the action of cam 236 via lifter cup 242 and spring guide 244. Lifter cup 242 is slotted for radial pins 240. The pressure setting mechanism and action for valve 190 closely parallel those described hereinbefore for relief valve 132 in conjunction with FIGS. 10 and 11.

An annular dirt guard 246 of resilient rubber-like material closes off the annular space between flange 217 and sleeve cam 236, yet permits rotation and axial translation of flange 217, as required for pressure setting.

Figure 18:
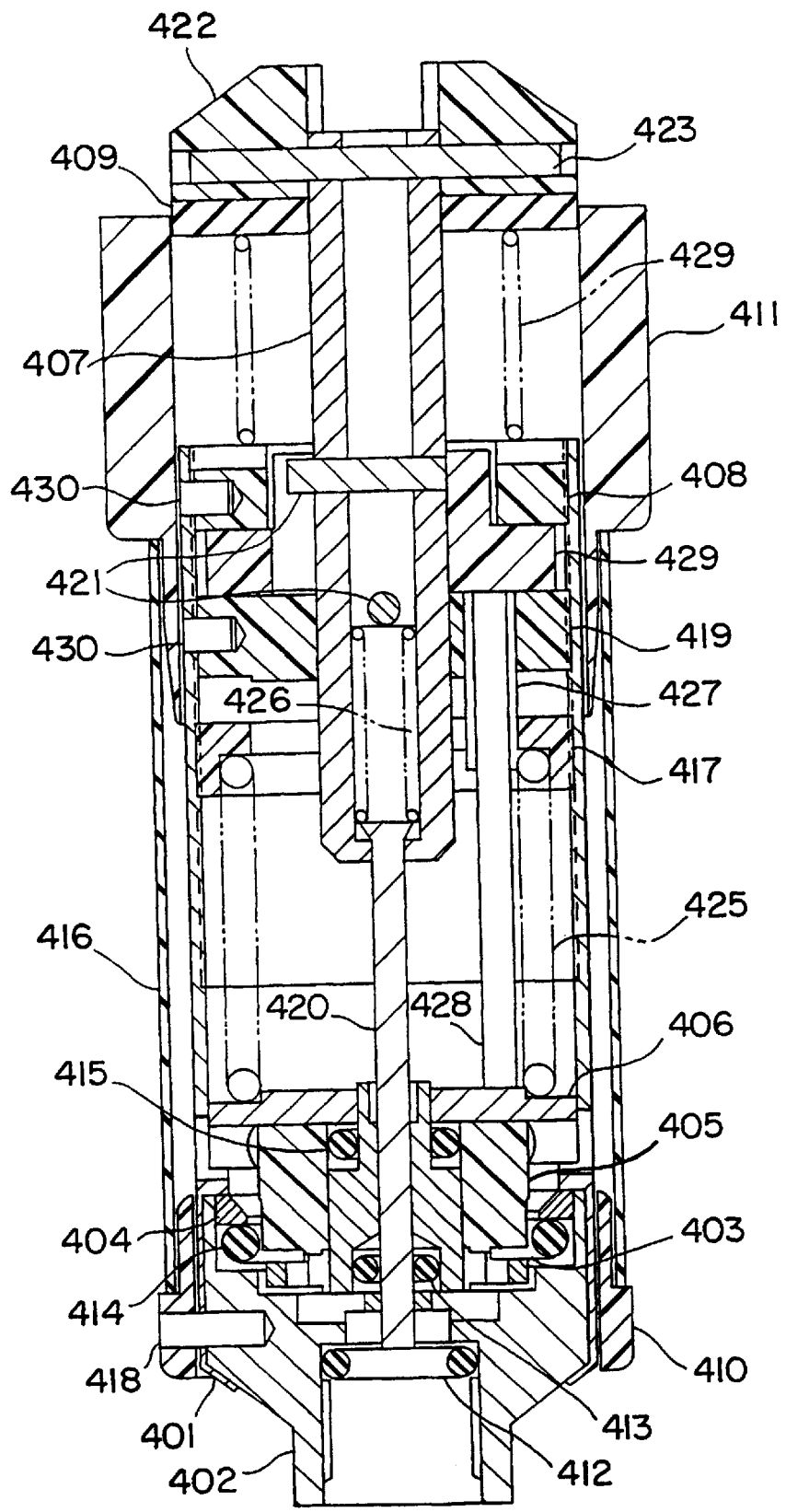
FIG. 18 is a schematic axial sectional view of another embodiment of the invention shown in inactive state.
Figure 19:
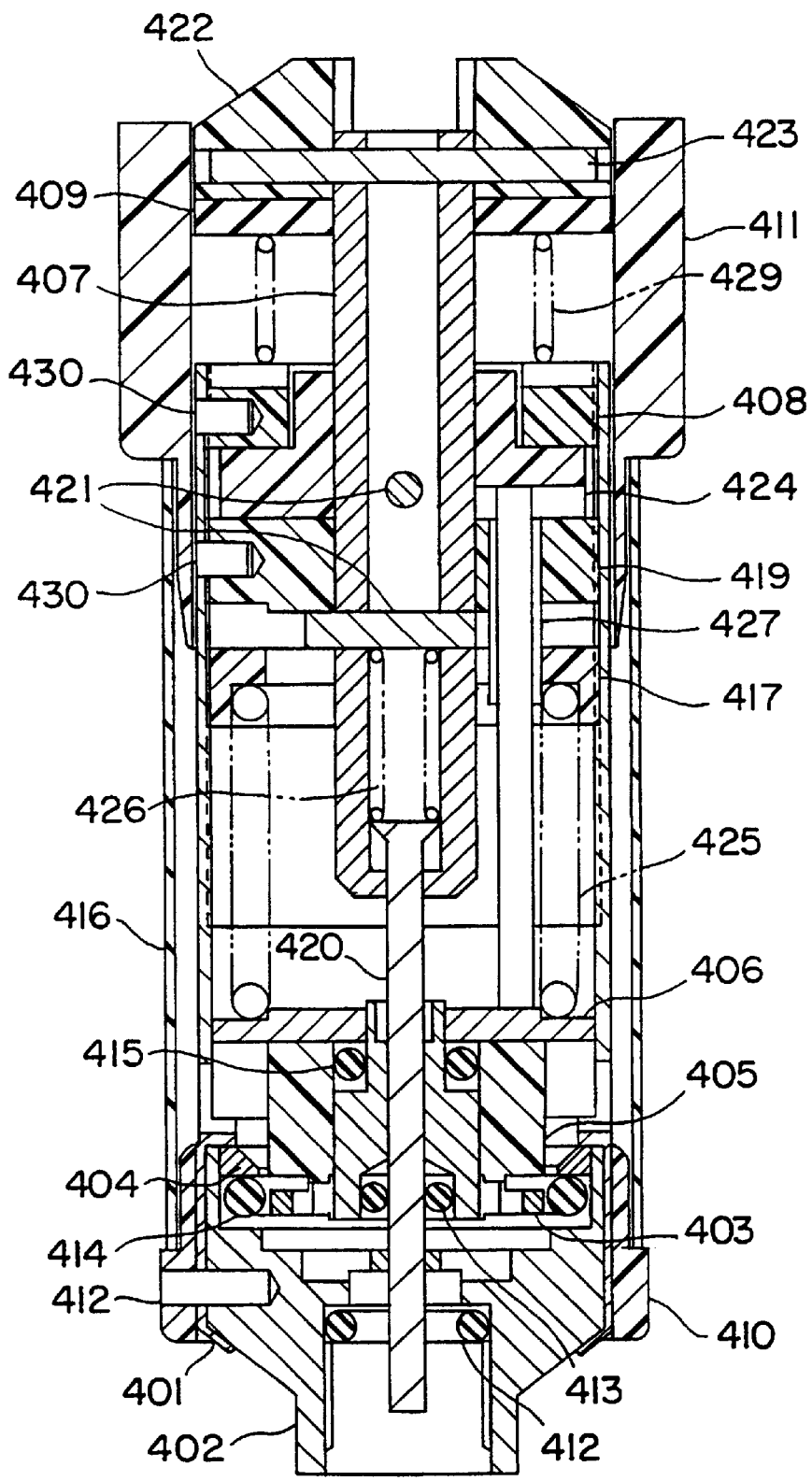
FIG. 19 is a schematic axial sectional view of the apparatus of FIG. 18 shown in active state.

FIGS. 18 and 19, depict yet another embodiment of the present invention. This embodiment is similar in many respects to the single pressure, manually activated deflator valve described in FIG. 9, however, this version incorporates a sequential activation means. The sequencing means includes (a) a means of locking the main poppet in a sealed position prior to activation, (b) a means of fully opening the tire stem core valve, (c) a means of releasing the deflator valve main poppet to permit regulation to the desired tire pressure, and (d) a means of locking the deflator valve activation mechanism in the operational position. The sequencing means and its components will now be considered in light of the preferred embodiment of FIGS. 18 and 19, although it should be understood that the other configurations are possible.

Referring to FIG. 18, which shows the deflator valve before actuation, the main poppet spring 425 preset load is set by adjustment of the spring reset ring 417 which threads into housing 401. A locking pin 428 holds the poppet spring guide 406 in place preventing the poppet 405 from opening before actuation. The locking pin 428 is guided by a sleeve 427 in the retaining ring 419 which also screws into the valve housing 401 and is pinned in place with pin 430, and which also has a longitudinal slot cut into the inner diameter allowing the extension of the lower pin 421 to slide axially when the actuating pin 407 is pushed downward against spring 429. The lower end of spring 429 is held in place by the upper retaining ring 408 which screws into the valve housing 401 and is pinned in place with pin 430.

This upper retaining ring 408, along with the lower retaining ring 419, holds the pin actuator cylinder 424 in place without restricting rotary motion. The pin actuator cylinder 424 initially holds the poppet locking pin 428 in place preventing the poppet 405 from opening. The pin actuating cylinder 424 also has a longitudinal groove cut into the inner diameter which allows the extension of the upper pin 421 to slide axially when the actuating pin 407 is pushed downward against spring 429 similar to the clearance provided in the lower retaining ring 419 for the extension of the lower pin 421 in the actuating pin 407. The pin actuating cylinder 424 also has a depression machined into the surface which holds the poppet locking pin 428 initially in place, which allows the locking pin 428 to move upward releasing the poppet 405 when the pin actuating cylinder 424 is rotated.

The actuating pin 407 is shown in FIG. 18 in the fully retracted position. Rod 420, the part which opens the tire core valve by depressing the core valve pin, is guided by both the inner diameter of the actuating pin 407, and the inner diameter of the poppet assembly 405. The rod 420 is assembled into the inner diameter of the activation pin 407 with a spring 426 with sufficient preload to depress the center pin of the core valve in the tire stem. This spring insures full opening of the tire stem valve while at the same time accommodating the large tolerance for the location of the end of the core valve pin relative to the tire stem (e.g., 0.010 inches above to 0.035 inches below the stem lip).

FIG. 19 shows the manually activated single pressure deflator valve after activation. The entire activation pin assembly including the activation pin 407, the adjustment knob 422, rubber seal washer 409, and pins 421 and 423 has been pushed downward and rotated to lock it into place. The core valve depressing rod 420 has also moved downward, but not as much as the activating pin 407. The reason for this is that the rod 420 is assumed to have contacted the center pin of the tire stem core valve, depressed it completely until it reached bottom thereby opening the core valve fully, and then accommodated further motion of the actuating pin 407 by causing the spring 426 inside the actuator pin 407 to compress against the lower pin 420. Note that the dust seal 409 has also traveled with the actuating pin 407 maintaining a seal with the inner diameter of the rear housing 411.

The downward motion of the actuating pin 407 causes the tire core valve to open due to the action of the depressing rod 420 on the core valve pin. Since the locking pin 428 is still held in place by the pin actuator cylinder 424, the poppet 405 remains closed, although fully exposed to tire pressure. At the same time the upper and lower pins 420 in the activation pin 407 have traveled axially through the slots in pin actuation cylinder 424 and the lower retaining ring 419 respectively. All this has occurred due to the downward force exerted manually by the operator on the adjustment knob 422.

As the operator turns the adjustment knob 422, along with the actuating pin 407 and both upper and lower pins 421, the pin actuator cylinder 424 also rotates causing the depression in the lower locking surface of the pin actuation cylinder 424 to align with the locking pin 428 allowing it to move upward releasing the poppet 405 as shown in FIG. 19. The valve is now fully operational and deflates the tire to the desired pressure.

At the same time, rotating the adjustment knob 422, along with the actuating pin 407, also rotates the extension of the lower pin 421 in the activation pin 407 away from the slot in the lower retaining ring 419. Thus, upon release of the adjustment knob 422 by the operator, the entire activating pin assembly 407, 422 and pins 421 and 430 is held in place axially by the extension of the lower pin 421 bearing against the lower surface of the lower retaining ring 419. The valve is reset by simply reversing the order of motion; i.e. the adjustment knob 422 is rotated in the opposite direction and allowed to move upward under the influence of either pressure or spring forces or both.

While the invention has been particularly shown and described with reference to preferred embodiments thereof, it will be understood by those skilled in the art that various changes and modifications in form and details may be made therein without departing from the spirit and scope of the invention.

What is claimed is:

1. A valve for releasing fluid from a relatively higher pressure source to a relatively lower pressure receiver, said valve comprising:

a housing having a first cavity, a second cavity, and an annular interior sealing surface, said first and second cavities being axially disposed and said annular interior sealing surface being axially disposed between them, said first cavity having connection means for operatively connecting to said source;

an elastomeric ring;

a poppet being disposed coaxially within said housing and having a substantially cylindrical side wall, at least a portion of said side wall being an external sealing surface, said poppet also having fluid channeling means for channeling the fluid from said first cavity radially outward through at least one orifice in said side wall, said poppet being axially movable at least between a closed position and a fully opened position, in said closed position, said elastomeric ring contacts said exterior sealing surface and said interior sealing surface such that said first cavity is hermetically sealed from said second cavity, in said fully opened position, said orifice is disposed relative to said elastomeric ring such that fluid radially exiting said orifice deforms said elastomeric ring outwardly forming a gap between said side wall and said elastomeric ring, said gap enhancing the egress of fluid from said first cavity to said second cavity; and actuation means for controlling said poppet's axial movement between said closed position and said fully opened position.

2. The valve according to claim 1, wherein said fluid channeling means includes a radial flow nozzle, said elastomeric ring being elastically deformed by flow of fluid issuing thereagainst from said radial nozzle.

3. The valve of claim 2, wherein said elastomeric ring has first and second roughly hemispherical portions relative to said first and second cavities, said orifice being proximate to said first portion when said poppet is in said closed position, said orifice being proximate to said second portion when said poppet is in said fully opened position.

4. The valve according to claim 1, wherein said connection means includes means for mounting and sealedly connecting said first cavity to said container of pressurized fluid.

5. The valve of claim 4, wherein said connecting means is adapted to mount onto a valve stem of a pneumatic tire.

6. The valve according to claim 4, further comprising:

means for inflating said pneumatic tire directly through said valve.

7. The valve according to claim 1, wherein said housing comprises a sleeve of elastomeric material and at least one vent orifice that facilitates fluid communication between a portion of said second cavity and said receiver, said sleeve covering said vent orifice, said sleeve being configured to minimize entry of foreign particles into said vent orifice.

8. The valve of claim 4, further comprising:
    means for indicating fluid pressure in said container, said means for indicating including an extension from said poppet, a portion of said extension protruding through said housing, said protrusion being indicative of said fluid pressure in said container.

9. The valve of claim 1, wherein at least a portion of said side wall includes means for restraining said ring seal from excessive deformation while said poppet is in said fully opened position, said means for restraining being disposed proximate to said orifice on the first cavity side of said orifice.

10. The valve according to claim 1, wherein said housing comprises restraining means to restrict the axial movement of said elastomeric ring, said restraining means including an annular backup ring adjacent to said elastomeric ring on its second cavity side.

11. The valve according to claim 1, wherein said actuating means comprises urging means for urging said poppet axially toward said first cavity.

12. The valve of claim 11, wherein said urging means comprises at least one spring connected between said housing and said poppet.

13. The valve of claim 12, wherein said urging means includes means for choosing a loading of said poppet from a plurality of predetermined loading magnitudes.

14. The valve of claim 13, wherein said means for choosing includes means for registering and holding a chosen spring-loading magnitude, said means for registering and holding including a rotatable, cylindrical, sleeve cam.

15. The valve according to claim 1, wherein said connection means further comprises means for exposing said poppet to said pressurized fluid by actuating a check valve to release said pressurized fluid into said first cavity.

16. The valve of claim 15, further comprising:
    sequencing means for controlling the release of fluid from said pressurized container having an outlet valve into said first cavity, said sequencing means comprising:
        means of locking said poppet in said closed position prior to fluid release;
        means of fully opening said outlet valve of said pressurized container to release said fluid into said first cavity; and
        means of releasing said poppet to permit axial movement into said fully opened position.

17. The valve according to claim 1, wherein said actuating means include force-balancing means for force-balancing said poppet in its relative axial position in said housing, said force-balancing means including:
    means for spring loading said poppet, said means for spring loading including at least one spring disposed between said housing and said poppet to exert a spring force on said poppet toward said first cavity; and
    means for exposing said first cavity to said fluid of said pressurized container, and thereby defining a pressure force against said poppet toward said second cavity, the difference between said spring force and said pressure force being defined as a force difference, said force balancing means being operative in moving said poppet axially in a direction to diminish said force difference.

18. The valve of claim 1, wherein said poppet has an axial extension toward said second cavity, said extension protruding from said housing and including a conduit for conducting fluid from said first cavity through said extension, said conduit including means for stopping fluid flow therethrough.

19. A valve for relieving excess fluid pressure in a container of pressurized fluid to a preset pressure, the valve comprising:
    a housing having a cavity and therein an internal seal surface of substantially cylindrical form, said housing including a seal that is ring-shaped and formed of an elastomeric material, said seal seating upon said internal seal surface and being restrained from substantial axial movement, said seal being resiliently and elastically deformable; and,
    a poppet coaxially movably borne within said cavity, said poppet having an external surface of cylindrical shape that is disposed coaxially within said cavity, said external surface, ring seal and internal surface cooperating to form a seal, said poppet having a first and a second axial end, said poppet including means for bypassing said seal, said means for bypassing including a passage for fluid between said first axial end and said external surface, said passage including at least one face conduit and a channel connecting therefrom substantially radially through said external surface, said channel including means for deforming said seal to deform said seal and form a gap between a portion of said seal and said external surface when said poppet is in a fully opened position.

20. A valve for relieving fluid pressure in a container of pressurized fluid from excess pressure to a preset pressure, the valve comprising:
    a housing having a first cavity and a second cavity, said cavities being disposed axially and adjacently, said housing including a ring-shaped seal and a seat therefor disposed between said cavities;
    a poppet coaxially borne between said first cavity and said second cavity, said poppet being coaxially movable to fully opened and closed positions, said poppet having an external sealing surface that is substantially cylindrical for sealing against said ring-shaped seal when said poppet is in said closed position thereby hermetically sealing said first cavity from said second cavity;
    the valve being characterized by a gap between said external sealing surface and a portion of said ring-shaped seal that faces toward said external sealing surface while said poppet is in said fully opened position; and, common means for channeling relief flow past said ring-shaped seal from said first cavity to said second cavity and for deforming said seal to promote widening of said gap while the valve is operative in relieving excess pressure in said container.

* * * * *